United States Patent
Hamada

(10) Patent No.: US 7,463,797 B2
(45) Date of Patent: Dec. 9, 2008

(54) WAVELENGTH MULTIPLEXED LIGHT SOURCE AND WAVELENGTH MULTIPLEXED LIGHT SOURCE SYSTEM

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/017,375

(22) Filed: Jan. 22, 2008

(65) Prior Publication Data

US 2008/0175533 A1    Jul. 24, 2008

(30) Foreign Application Priority Data

Jan. 23, 2007   (JP)   ............... 2007-013080

(51) Int. Cl.
  G02B 6/26   (2006.01)
  G02B 6/28   (2006.01)
  G02B 6/34   (2006.01)
  H04J 14/02  (2006.01)
(52) U.S. Cl. .................. 385/17; 385/24; 385/37
(58) Field of Classification Search ............. None
   See application file for complete search history.

(56) References Cited

U.S. PATENT DOCUMENTS 6,594,297 B1    7/2003  Hayakawa
6,993,258 B2 *  1/2006  Payne et al. ............ 398/92
7,295,783 B2 *  11/2007 Singh et al. ............ 398/175
2004/0001716 A1 * 1/2004 Daou et al. ............ 398/82

FOREIGN PATENT DOCUMENTS

| JP | 2000-077756 A | 3/2000 |
| JP | 2001-148536 A | 5/2001 |
| JP | 2001-166160 A | 6/2001 |
| JP | 2004-104662 A | 4/2004 |

* cited by examiner

Primary Examiner—Michelle R Connelly Cushwa
(74) Attorney, Agent, or Firm—RatnerPrestia

(57) ABSTRACT

A wavelength multiplexed light source using multimode interference is provided. The light source includes an input unit for inputting a plurality of incident lights, input waveguides for individually guiding the incident lights, a multimode waveguide having an input edge connected to the input waveguides so that each incident light is coupled at a predetermined position on an output edge opposite to the input edge and an output waveguide connected to the predetermined position. Two incident lights having adjacent wavelengths are arranged relative to a central position of the input edge based on a respective wavelength for the incident light.

12 Claims, 14 Drawing Sheets

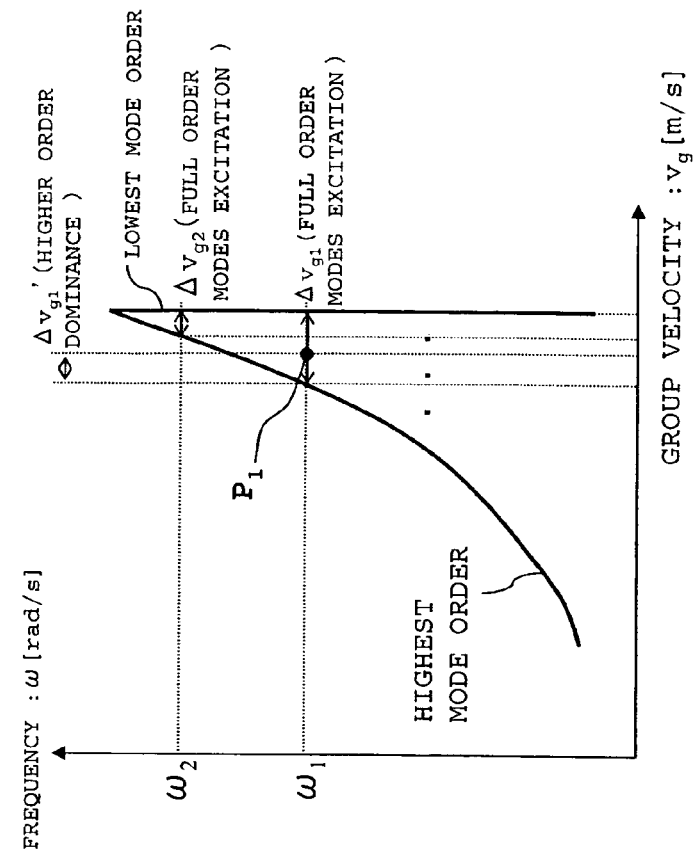
FIG.2(A) DISPERSION CHARACTERISTICS OF TWO DIMENSIONAL MULTIMODE WAVEGUIDE
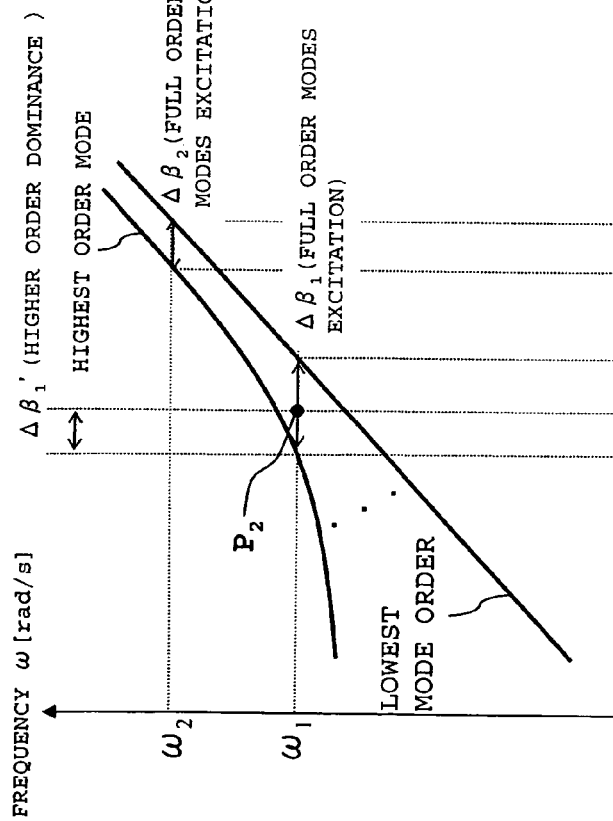
FIG.2(B) GROUP VELOCITY CHARACTERISTICS OF TWO DIMENSIONAL MULTIMODE WAVEGUIDE

WAVELENGTH MULTIPLEXED LIGHT SOURCE AND WAVELENGTH MULTIPLEXED LIGHT SOURCE SYSTEM

BACKGROUND OF THE INVENTION

1. Field of the Invention

The present invention relates to a wavelength multiplexed light source and a wavelength multiplexed light source system for wavelength division multiplexing communication. For example, the present invention relates to a wavelength multiplexed light source and a wavelength multiplexed light source system in which wavelengths are multiplexed by a coupler using a multimode interference within a multimode waveguide.

2. Related Art of the Invention

The recent increased demand for communication has remarkably developed a wavelength division multiplexing communication which achieves an increased capacity of transmission without establishing a new transmission path.

A wavelength multiplexed light source is a device used for the wavelength division multiplexing communication. For example, Japanese Patent Laid-Open No. 2000-77756 proposes a wavelength multiplexed light source which includes a 1×N waveguide splitter using MMI (multimode interference) effect, an N number of semiconductor optical amplifiers that are connected to each access wave guide of the 1×N waveguide splitter, and an N number of waveguides having a function to select a wavelength.

FIG. 12 is a diagram showing a conventional wavelength multiplexed light source which is proposed in Japanese Patent Laid-Open No. 2000-77756. FIG. 12 shows a case where the number N is equal to 4.

An output waveguide 401 is connected with a waveguide splitter 402 having a 1×4 type MMI structure. The waveguide splitter 402 has access wave guides which are connected to semiconductor optical amplifiers 404$_1$, 404$_2$, 404$_3$ and 404$_4$ having curved waveguides, respectively, and the semiconductor optical amplifiers 404$_1$, 404$_2$, 404$_3$ and 404$_4$ are connected to fiber gratings 407$_1$, 407$_2$, 407$_3$ and 407$_4$ at one end thereof in which lights have different central wavelengths $\lambda_1$, $\lambda_2$, $\lambda_3$ and $\lambda_4$ respectively.

The combination of the semiconductor optical amplifiers 404$_1$, 404$_2$, 404$_3$ and 404$_4$ and the fiber gratings 407$_1$, 407$_2$, 407$_3$ and 407$_4$ forms a resonance structure for emitting a laser beam.

The above structure provides an improved wavelength selectivity which is one of the wavelength dependences in space domain.

As a wavelength multiplexed light source having another structure, for example, Japanese Patent Laid-Open No. 2001-166160 proposes an optical coupler for minimizing optical loss in each wavelength, which includes a 1×N waveguide splitter using MMI effect, a plurality of single mode waveguides that are optically connected to the waveguide splitters for individually transmitting different wavelengths therethrough, and multimode waveguides that are interposed between the waveguide splitters and the single mode waveguides having a predetermined length depending on the wavelength respectively.

FIG. 13 is a two-dimensional diagram showing a structure of a conventional optical coupler proposed in Japanese Patent Laid-Open No. 2001-166160, FIG. 13 shows a case where the number N is equal to 4.

The optical coupler includes a multimode optical interference region 120A which is formed with an incident end surface 120$_2$ and an exit end surface 120$_1$, opposite to the incident end surface 120$_2$, and has a physical width Wm.

The incident end surface 120$_2$ are optically connected with a plurality of incident-side single mode optical waveguides 120C$_1$, 120C$_2$, 120C$_3$ and 120C$_4$ for transmitting optical signals which have wavelengths of $\lambda_1$, $\lambda_2$, $\lambda_3$ and $\lambda_4$ (where $\lambda_1 > \lambda_2 > \lambda_3 > \lambda_4$) respectively, and between the optical waveguides 120C$_2$, 120C$_3$ and 120C$_4$ and the incident end surface 120$_2$, extending sections, 120E$_2$, 120E$_3$ and 120E$_4$ are interposed respectively.

The exit end surface 120$_1$ is connected with a single mode optical waveguide 120B for transmitting the wavelength-multiplexed optical signals having wavelengths of $\lambda_1$, $\lambda_2$, $\lambda_3$ and $\lambda_4$.

In this case, the multimode optical interference region 120A has a length of $L_{mmi}$ which is set to cause the incident light having a wavelength $\lambda_1$ from the optical waveguide 120C$_1$ to reach the exit end surface 120$_1$ with a minimum optical loss. Also, each of the extending sections 120E$_2$, 120E$_3$ and 120E$_4$ has a length of $L_{ext}$ which is set so that the length of $L_{mmi} + L_{ext}$ causes each of the lights having the wavelength $\lambda_2$, $\lambda_3$ and $\lambda_4$ to reach the exit end surface 120$_1$ with a minimum optical loss.

Each of the extending sections 120E$_2$, 120E$_3$ and 120E$_4$ has a width larger than those of the single mode optical waveguides 120C$_2$, 120C$_3$ and 120C$_4$, and form a multimode optical waveguide similar to the multimode optical interference region 120A. As a result, when the optical signals enter the extending sections 120E$_2$, 120E$_3$ and 120E$_4$, the optical signals guided through the single mode optical waveguides 120C$_2$, 120C$_3$ and 120C$_4$ are dispersed as shown by the broken lines in FIG. 13, and are incident to the multimode optical interference region 120A.

After entering the multimode optical interference region 120A, the optical signals produce a multimode interference in the multimode optical interference region 120A. Each of the extending sections 120E$_2$, 120E$_3$ and 120E$_4$ has a width larger than those of the single mode optical waveguides 120C$_2$, 120C$_3$ and 120C$_4$ so that the dispersion of the optical signals entering the multimode optical interference region 120A is not disturbed, which allows each of the optical signals having the wavelength $\lambda_1$, $\lambda_2$, $\lambda_3$ and $\lambda_4$ to have a strong light intensity due to self-imaging effect at the portion of the exit end surface 120$_1$ where the single mode optical waveguide 120B is connected.

The above structure provides an improved optical coupling condition which is one of the wavelength dependences in space domain.

The increased number of multi-wavelengths due to the recent increased demand for communication causes the N number of 1×N waveguide splitters to be increased, including a width of the 1×N waveguide splitters, resulting in that the modal dispersion along the 1×N waveguide splitters is steadily on the increase.

This trend is likely to continue, and the increased modal dispersion along a multimode waveguide may cause a performance degradation due to the wavelength dependence of a modal group velocity dispersion (a modal dispersion which is dominated by time domain). In addition to each condition based on the wavelength dependence of modal dispersion (a wavelength dependence of self-imaging effect) which is dominated by a space domain, it is a desirable to improve the wavelength dependence of modal dispersion, as disclosed, for example, in the above Japanese Patent Laid-Open No. 2000-77756 and Japanese Patent Laid-Open No. 2001-166160.

The problem of performance degradation due to the wavelength dependence of modal group velocity dispersion will be explained below.

The wavelength dependence of a modal group velocity dispersion is one of the characteristics of light that a light of a longer wavelength has a larger group velocity dispersion than a light of a relatively shorter wavelength.

The output pulses of a light of a longer wavelength, having a larger group velocity dispersion which contain pulse groups in eigenmodes that are separated on a time-axis by the group velocity dispersion, are more extensively broadened than those of a light of a shorter wavelength having a smaller group velocity dispersion. Therefore, a large variation in the output pulse widths may supposed to occur in the entire optical signals having different wavelengths which are used in the wavelength multiplexed light source.

The performance degradation due to the wavelength dependence of a modal group velocity dispersion means the efficiency degradation of wavelength multiplexing transmission which is caused by the variation in the output pulse widths of optical signals having different wavelength in the wavelength multiplexed light source.

That is, at the output end of a wavelength multiplexed light source, there is a difference in the transmitting capacities and transmission distances between the optical signal of the shortest wavelength, which causes the smallest output pulse spreading, and the optical signal of the longest wavelength, which causes the largest output pulse spreading. The transmission capacity and transmission distance of the optical signal of the longest wavelength have the largest output pulse spreading, which results in the lowest transmission efficiency, dominating the transmission capacity and transmission distance of the wavelength multiplexing transmission. This is because any combination with a transmission capacity and a transmission distance of another optical signal having another wavelength may make the output pulse spreading of the optical signal of a longer wavelength than such another wavelength indistinguishable, which leads to a transmission error.

As described above, the variation in the output pulse widths of the optical signals having different wavelengths disturbs the efficiency of a wavelength multiplexing transmission.

SUMMARY OF THE INVENTION

The present invention was made in view of the above problems in the prior art, and one object of the present invention is to provide a wavelength multiplexed light source and a wavelength multiplexed light source system in which a variation in the output pulse widths between optical signals having different wavelength due to the wavelength dependence of a modal group velocity dispersion is reduced so that a more efficient wavelength multiplexing transmission is achieved.

The $1^{st}$ aspect of the present invention is a wavelength multiplexed light source, comprising:

an input unit having an N number of input ends to which an N number of incident lights (N is an integer greater than or equal to two) of different wavelengths are input, and the N number of output ends from which the incident lights are respectively output;

the N number of input waveguides which are respectively connected to the N number of output ends of the input unit and individually guide the N number of incident lights;

a multimode waveguide for 1×N couplings having an input edge of a width W on one side thereof, with the N number of input waveguides being respectively connected to the input edge so that each of the incident lights is input to the input edge to be coupled at a predetermined position on an output edge on the other side opposite to the input edge; and an output waveguide which is connected to the predetermined position on the output edge of the multimode waveguide for 1×N couplings, wherein input positions where the N number of incident lights are input to the multimode waveguide for 1×N couplings are set so that, for two of the incident lights having adjacent wavelengths, the distance from the central position of the input edge of the multimode waveguide for 1×N couplings to the input position for the incident light having a longer wavelength is equal to or more than that for the incident light having a shorter wavelength.

The $2^{nd}$ aspect of the present invention is the wavelength multiplexed light source according to the $1^{st}$ aspect of the present invention, wherein each of the incident lights which are input to the input edge of the multimode waveguide for 1×N couplings has a beam diameter of W/5 or less.

The $3^{rd}$ aspect of the present invention is the wavelength multiplexed light source according to the $1^{st}$ aspect of the present invention, wherein the input unit has an incident light detecting section for detecting a wavelength and a beam diameter of each of the incident lights, and depending on the wavelengths and the beam diameters of the incident lights, controlling the input positions at which the incident lights are input to the multimode waveguide for 1×N couplings by switching the connection between the N number of input ends and the N number of output ends.

The $4^{st}$ aspect of the present invention is the wavelength multiplexed light source according to the $1^{st}$ aspect of the present invention, wherein the input unit has an optical switch for switching the connection between each of the N number of input ends and each of the N number of output ends.

The $5^{th}$ aspect of the present invention is the wavelength multiplexed light source according to the $1^{st}$ aspect of the present invention, further comprising:

a beam diameter control unit which is provided at a predetermined position between the input ends of the input unit and the input edge of the multimode waveguide for 1×N couplings, for controlling a beam diameter of the incident light which is input to the input edge of the multimode waveguide for 1×N couplings to be W/5 or less in the case that the incident light has a beam diameter exceeding W/5.

The $6^{th}$ aspect of the present invention is the wavelength multiplexed light source according to the $1^{st}$ aspect of the present invention, wherein the N number of incident lights are controlled so that the incident lights to be input to the positions closer to the central position of the input edge of the multimode waveguide for 1×N couplings are delayed to be incident to the multimode waveguide for 1×N couplings by a longer time.

The $7^{th}$ aspect of the present invention is the wavelength multiplexed light source according to the $6^{th}$ aspect of the present invention, wherein the delays of the incident lights are controlled using modulation control of the optical signals at the N number of light sources which respectively supply the N number of incident lights.

The $8^{th}$ aspect of the present invention is the wavelength multiplexed light source according to the $6^{th}$ aspect of the present invention, wherein the N number of input waveguides are those in which the guided incident lights having a shorter wavelength have a slower coherent group velocity of wavelength dispersion.

The 9th aspect of the present invention is a wavelength multiplexed light source, comprising:

an input unit having an N number of input ends to which an N number of incident lights (N is an integer greater than or equal to two) of different wavelengths are input, and an N number of output ends from which the incident lights are respectively output;

the N number of input waveguides which are respectively connected to the N number of output ends of the input unit and individually guide the N number of incident lights;

a multimode waveguide for 1×N couplings having an input edge of a width W on one side thereof, with the N number of input waveguides being respectively connected to the input edge so that each of the incident lights is input to the input edge to be coupled at a predetermined position on an output edge on the other side opposite to the input edge; and an output waveguide which is connected to the predetermined position on the output edge of the multimode waveguide for 1×N couplings, wherein a smaller distance of two distances from the input position through which the incident light is input to the multimode waveguide for 1×N couplings to one of the positions separated from the central position of the input edge by 1/4W on both sides of the central position, for two of the incident lights having adjacent wavelengths, the smaller distance from each of the input positions to one of the positions on both sides of the central position are equal to each other, or the smaller distance for the light having a longer wavelength is smaller than the other.

The 10th aspect of the present invention is the wavelength multiplexed light source according to the 9th aspect of the present invention, wherein each of the incident lights which are input to the input edge of the multimode waveguide for 1×N couplings has a beam diameter exceeding W/5.

The 11th aspect of the present invention is a wavelength multiplexed light source system, comprising:

an M number of wavelength multiplexed light sources (M is an integer greater than or equal to two) according to the 1st aspect of the present invention or the 9th aspect of the present invention;

a multiplexed lights input unit, having: an M number of input ends to which the M number of wavelength multiplexed lights which are output from each of the wavelength multiplexed light sources are input, and an M number of output ends from which the wavelength multiplexed lights are respectively output;

an M number of the multiplexed light input waveguides which are connected to the M number of output ends of the multiplexed light input unit for individually guiding the M number of wavelength multiplexed lights;

a multimode waveguide for 1×M couplings having an input edge on one end thereof, with the M number of input waveguides being respectively connected to the input edge in the width direction so that each of the wavelength multiplexed lights is input to the input edge to be coupled at a predetermined position on an output edge on the other side opposite to the input edge; and a multiplexed light output waveguide which is connected to the predetermined position on the output edge of the multimode waveguide for 1×M couplings.

The 12th aspect of the present invention is the wavelength multiplexed light source system according to the 11th aspect of the present invention, wherein the M number of wavelength multiplexed lights have M number of wavelength ranges which are different from each other and do not overlap each other.

The 13th aspect of the present invention is a wavelength multiplexed light source comprising:

an input unit configured to receive an N(N is an integer greater than or equal to two) number of incident lights of respectively different wavelengths; and a multimode waveguide coupled to the input unit and configured to receive the N number of incident lights from the input unit, wherein the input unit includes a controller configured to rearrange an order of the incident lights relative to respective positions along an input edge of the multimode waveguide, based on a length of respective wavelengths of the incident lights.

The present invention provides a wavelength multiplexed light source and a wavelength multiplexed light source system in which a variation in the output pulse widths between the optical signals having different wavelengths due to the wavelength dependence of a modal group velocity dispersion is reduced so that a more efficient wavelength multiplexing transmission is achieved.

BRIEF DESCRIPTION OF THE DRAWINGS

FIG. 2(A) is an overview graph showing general dispersion characteristics of a two-dimensional rectangular multimode waveguide, FIG. 2(B) is an overview graph showing general group velocity characteristics of a two-dimensional rectangular multimode waveguide;

Figure 1:
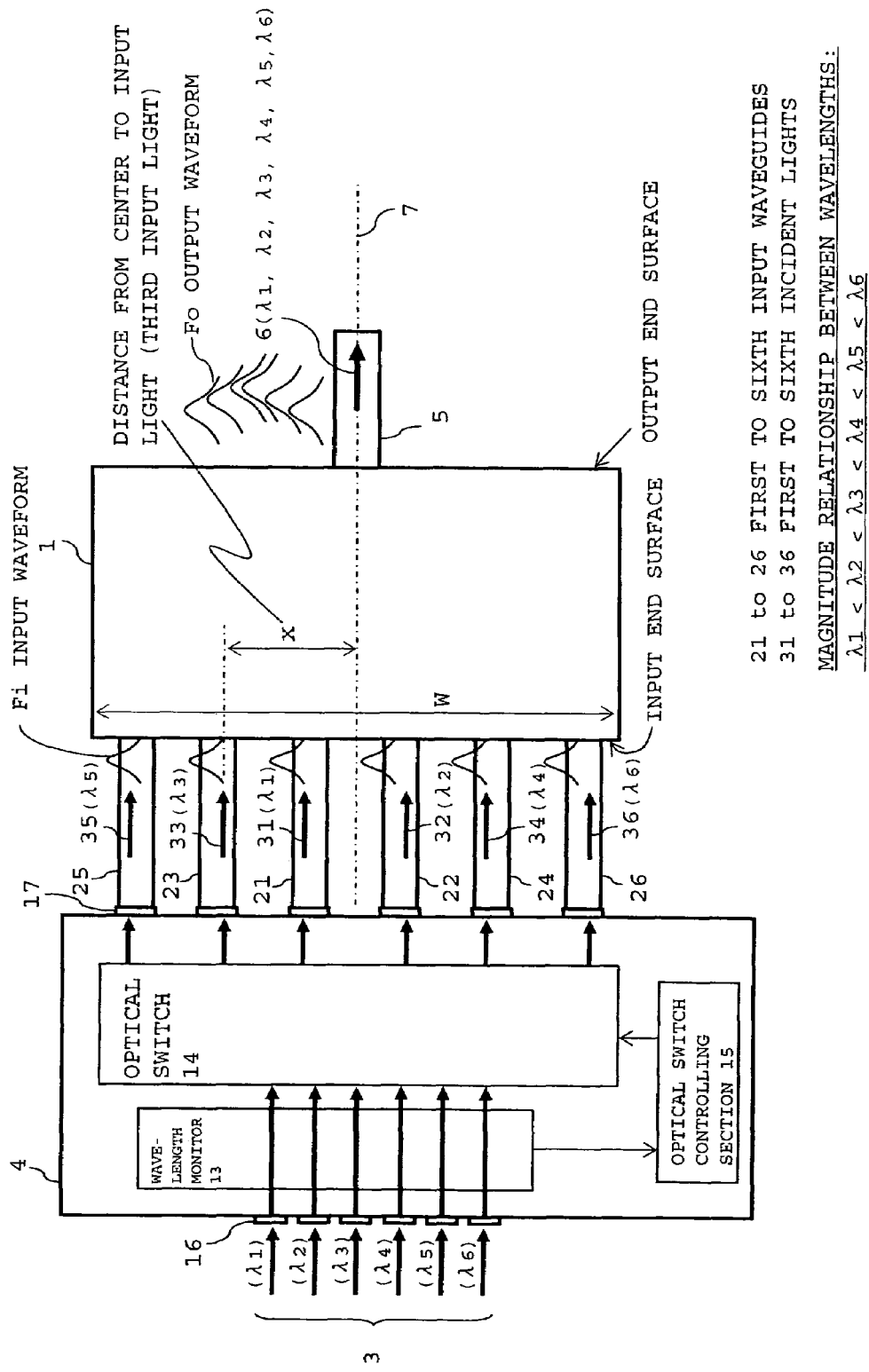
FIG. 1 is a configuration diagram showing a wavelength multiplexed light source according to Embodiment 1 of the present invention.

DESCRIPTION OF SYMBOLS 1 rectangular multimode waveguide
3 incident light
4 input position control unit
5 output waveguide
6 output multiplexed light
7 central axis
8 +W/4 axis
18 −W/4 axis
10 incident light
11 input position control unit
12 output waveguide
13 wavelength monitor
14 optical switch
15 optical switch controlling section
16 input end
17 output end
19 output multiplexed light
21 to 26 first to sixth input waveguides
27 input end
28 output end
29 lens
31 to 36 first to sixth incident lights frequency=$\lambda_1$ to $\lambda_6$)
38 output multiplexed light
41 to 46 first to sixth light sources
51 to 54 first to fourth input waveguides
61 to 64 first to fourth incident lights frequency=$\lambda_1$ to $\lambda_4$)
71 to 76 first to sixth wavelength multiplexed light sources
81 to 86 first to sixth wavelength multiplexed incident lights (frequency=$\lambda_1$i to $\lambda_6$i; i=1 to 6)

DETAILED DESCRIPTION OF THE INVENTION

Now, several embodiments of the present invention will be explained with reference to the accompanying drawings.

EMBODIMENT 1

FIG. 1 is a configuration diagram showing a wavelength multiplexed light source according to Embodiment 1 of the present invention.

A wavelength multiplexed light source of Embodiment 1 includes, as shown in FIG. 1, a rectangular multimode waveguide 1 (width W, optical path length L) which is of a multimode type in the width direction thereof. The rectangular multimode waveguide 1 has an input end surface and an output end surface, and a central axis 7 passes through the center of the input end surface and the center of the output end surface in the width direction thereof. The input end surface of the rectangular multimode waveguide 1 is connected with first to sixth input waveguides 21 to 26 at positions which are symmetrically located about the central axis 7 in the width direction of the input end surface, the reference numerals of the waveguides being given in order of closeness to the central axis 7. An output waveguide 5 is connected to the output end surface of the rectangular multimode waveguide 1 at a position on the central axis 7.

The first to sixth input waveguides 21 to 26 are waveguides through which a light is transmitted at an amount ratio of input to output of 1:1, and each of them has another end which is connected to an output end 17 of an input position control unit 4 which inputs six incident lights 3 to the first to sixth input waveguides 21 to 26, respectively, depending on the wavelength of the six incident lights 3. Each of the first to sixth input waveguides 21 to 26 has the same waveguide width, which means that the maximum waveguide width is W/6.

The input position control unit 4 includes a wavelength monitor 13 for monitoring the wavelengths of the six incident lights 3 which are input through six input ends 16 and have different wavelengths; an optical switch 14 for switching an output end 17 for individually outputting the six incident lights 3 which are input through the input ends 16; and an optical switch controlling section 15 for controlling the switching of the optical switch 14 depending on the wavelengths of the input incident lights 3.

The optical switch controlling section 15 controls the switching of the optical switch 14 so that, among the six incident lights 3 which are input through the input ends 16, the light having a shorter wavelength is incident to the input waveguide at an input position to the rectangular multimode waveguide 1 which is located closer to the central axis 7.

For example, as shown in FIG. 1, when the six incident lights 3, the reference numerals of which are given in order of shortness of wavelength (i.e., the six incident lights which have wavelengths $\lambda_1$ to $\lambda_6$ of the relationships therebetween: $\lambda_1<\lambda_2<\lambda_3<\lambda_4<\lambda_5<\lambda_6$), are input into the input ends 16, the output to the output end 17 is switched so that the first to sixth incident lights 31 to 36 ($\lambda_1$ to $\lambda_6$) are input to the first to sixth input waveguides 21 to 26 which are coupled in order of closeness to the central axis 7 of the input end surface of the rectangular multimode waveguide 1, respectively.

However, the mode interference having the most efficient coupling occurs within the rectangular multimode waveguide 1 when the output position is located at the center of the output end surface and each of the input positions is symmetrically disposed about the central axis 7 of the input end surface as shown in FIG. 1. Thereby, in the structure such as that of FIG. 1, the first to sixth incident lights 31 to 36 which are input into the first to sixth input waveguides 21 to 26 respectively have longer wavelengths in this order, but as to a distance x from the central axis 7 to the input position of each incident light, the first incident light 31 and the second incident light 32 are arranged at an equal distance x, the third incident light 33 and the fourth incident light 34 are arranged at another equal distance x, and the fifth incident light 35 and the sixth incident light 36 are arranged at still another equal distance x.

In Embodiment 1, the rectangular multimode waveguide 1 is an example of a multimode waveguide for 1×N couplings of the present invention, and the input end surface and the output end surface of the rectangular multimode waveguide 1 are examples of an input edge and an output edge of the present invention, respectively. Also, the input position control unit 4 is an example of an input unit of the present invention, and the wavelength monitor 13 is an example of an incident light detecting section of the present invention.

Now, the structure of a multi wavelength light source according to Embodiment 1 of the present invention will be described below.

First, the mechanism of a group velocity dispersion of a wavelength multiplexed light based on the dispersion characteristics of a rectangular multimode waveguide will be described below.

FIG. 2(A) is an overview graph showing general dispersion characteristics of the two-dimensional rectangular multimode waveguide 1 of FIG. 1, and FIG. 2(B) is an overview graph showing general group velocity characteristics of the two-dimensional rectangular multimode waveguide 1.

A phase velocity $v_p$ and a group velocity $v_g$ can be expressed by the following formula 1 where $\omega$ is frequency and $\beta$ is propagation constant:

$$\text{phase velocity: } v_p = \frac{\omega}{\beta} \quad \text{[Formula 1]}$$

$$\text{group velocity: } v_g = \frac{d\omega}{d\beta}$$

As general dispersion characteristics of a two-dimensional rectangular multimode waveguide, as shown in FIG. 2(A), a phase velocity $v_p$ is increased as the order is increased from the lowest (zeroth) order mode, while a group velocity $v_g$ is decreased as the order is increased as shown in FIG. 2(B). That is, a group velocity of each mode has a negative correlation with a mode order.

Now in the case where full order modes, starting from the zeroth order mode, are excited for an input of a given wavelength, in comparison between a relatively shorter wavelength (relatively higher frequency $\omega_2$) and a longer wavelength (relatively lower frequency $\omega_1$), as shown in FIG. 2(A), the frequency $\omega_1$ has a greater modal dispersion than the frequency $\omega_2$ ($\Delta\beta_1 > \Delta\beta_2$). As shown in FIG. 2(B), the frequency $\omega_1$ has a greater modal group velocity dispersion $\Delta v_g$ between the zeroth order mode and the highest ($N^{th}$) mode ($\Delta v_{g1} > \Delta v_{g2}$).

The above content is conventionally known, but the inventor of the present invention found the following fact as a result of intense study. That is, the effect under each order mode of a light which is input into a two-dimensional rectangular multimode waveguide is not constant, but varies for each mode depending on an input position of the light.

The present invention was made focusing on the above fact, and in the present invention, the controlling of input positions of lights having different wavelengths in a two-dimensional rectangular multimode waveguide enables a reduction of the wavelength dependence of a modal group velocity dispersion, so that a variation in the output pulse widths of optical signals can be reduced.

Now, the principle of the present invention will be described in more detail below.

An excited strength which imparts a light energy varies depending on a state of an incident light (an input position $x_u$ and an input beam diameter $\sigma$ at the central origin) for each mode, thereby the strength can be expressed by Formula 2 which is a function of an input position $x_u$ at the central origin, which may be used to examine the relationship between an incident light state and an excited strength.

$$\phi_p(x_u) = \quad \text{[Formula 2]}$$

$$\underline{\sin^2\left[(p+1)\pi\left(\frac{x_u}{W}+\frac{1}{2}\right)\right]} \frac{2}{p+1} \underline{\underline{\frac{(p+1)\frac{\pi}{2}\frac{\sigma}{W}\cos\left[(p+1)\frac{\pi}{2}\frac{\sigma}{W}\right]}{\left(\frac{\pi}{2}\right)^2 - \left[(p+1)\frac{\pi}{2}\frac{\sigma}{W}\right]^2}}}$$

where, p (p is an integer greater than or equal to 0) is a mode order.

As seen from Formula 2, since an excited strength $\phi_p(x_u)$ is expressed by a function with separated variables of an input position $x_u$ and an input beam diameter $\sigma$, (1) the relationship between an input position $x_u$ and an excited strength $\phi_p(x_u)$, that is the part of Formula 2 indicated by one underline, and (2) the relationship between an input beam diameter $\sigma$ and an excited strength $\phi_p(x_u)$, that is the part of Formula 2 indicated by two underlines, will be separately examined below.

Figure 3:
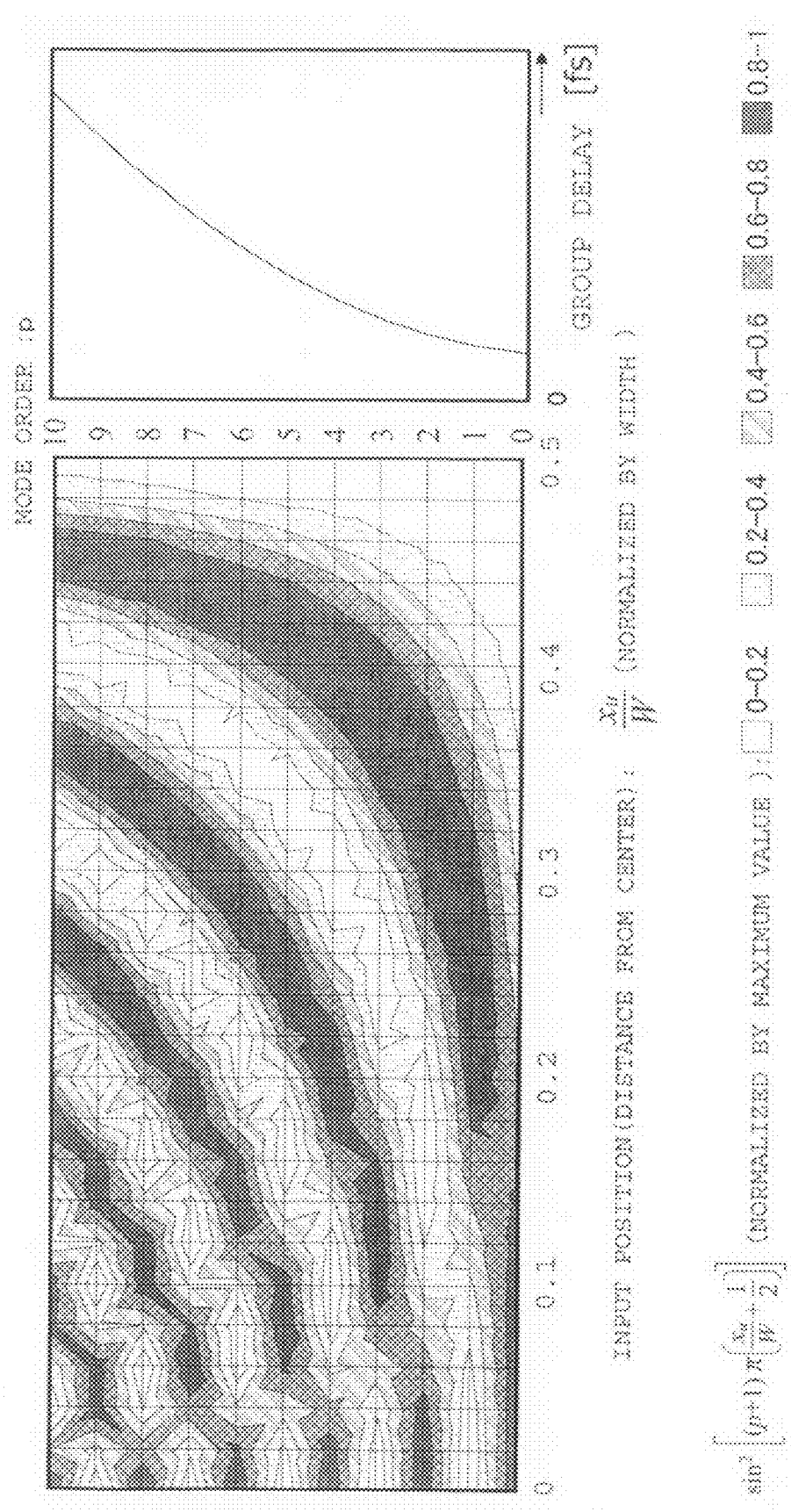
FIG. 3 is a graph showing the relationship between a distance from the center of an input position and an excited strength within a two-dimensional rectangular multimode waveguide.

First, the relationship between an input position $x_u$ and an excited strength $\phi_p(x_u)$ which is the part of Formula 2 indicated by one underline is shown in FIG. 3, and the specific input position where the mode has the local maximum energy (=1) or the local minimum energy (=0) are shown in Table 1.

TABLE 1

[The specific input position where the mode has the local maximum energy (=1) or the local minimum energy (=0)]

| p | $x_u/W$ | | | | | | | | | |
|---|---|---|---|---|---|---|---|---|---|---|
|   | 0 | 1/12 | 1/10 | 1/8 | 1/6 | 1/5 | 1/4 | 3/10 | 1/3 | 3/8 | 2/5 |
| 0 | 1 | — | — | — | — | — | — | — | — | — | — |
| 1 | 0 | — | — | — | — | — | 1 | — | — | — | — |
| 2 | 1 | — | — | — | 0 | — | — | — | 1 | — | — |
| 3 | 0 | — | — | 1 | — | — | 0 | — | — | 1 | — |
| 4 | 1 | — | 0 | — | — | 1 | — | 0 | — | — | 1 |
| 5 | 0 | 1 | — | — | 0 | — | 1 | — | 0 | — | — |

FIG. 3 and Table 1 show that the level of effects under each mode varies depending on input positions. Specifically, the specific input position where each mode has the local maximum or local minimum energy dominates the relationship between an input position $x_u$ and an excited strength $\phi_p(x_u)$. As shown in a graph which is given as a reference on the right of FIG. 3, since a mode order and a group delay have a positive correlation with each other, a replacement of the vertical axis for mode order with the one for time frame in FIG. 3 allows a qualitative change of an output waveform over time to be indicated.

Figure 4:
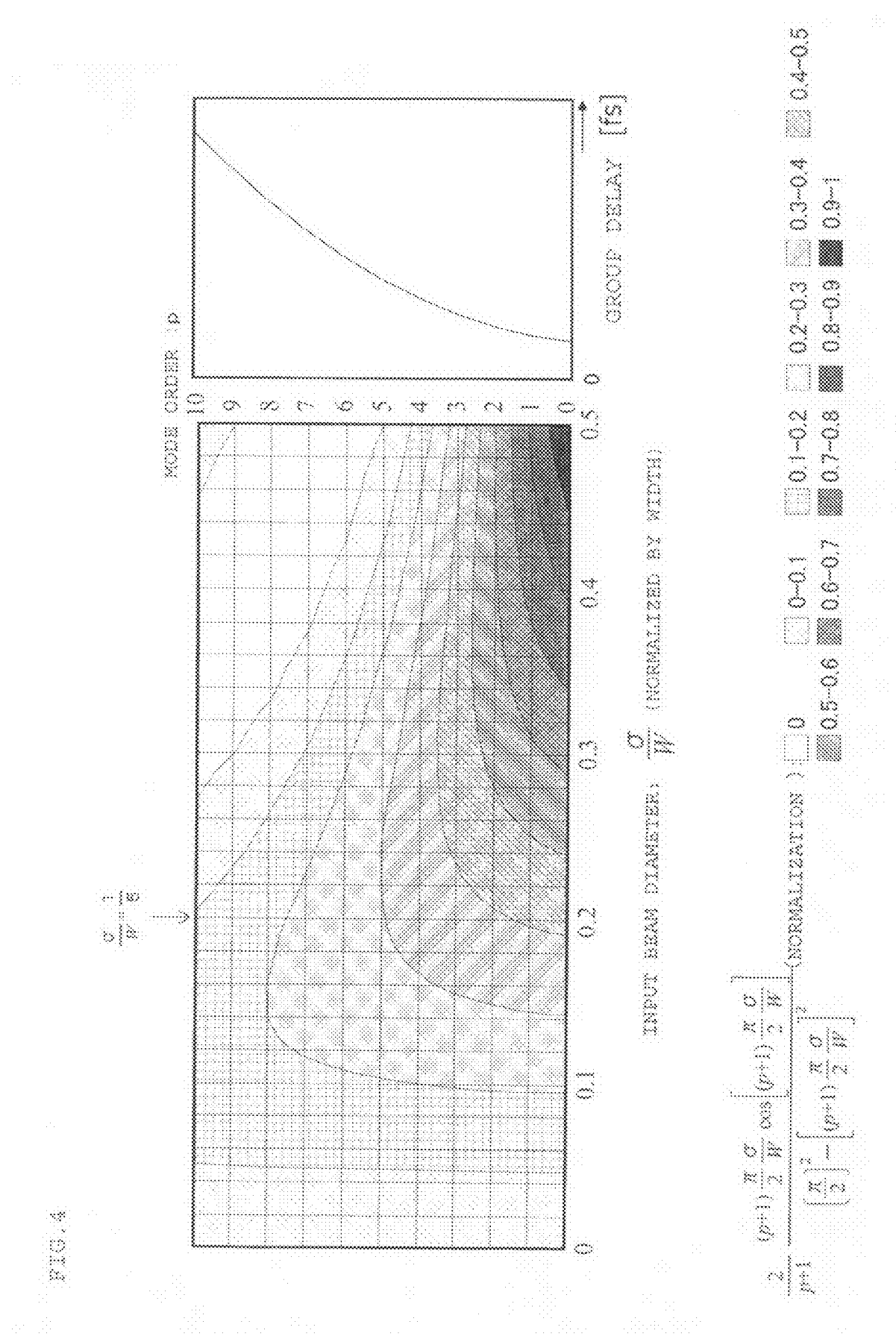
FIG. 4 is a graph showing the relationship between an input beam diameter and an excited strength within a two-dimensional rectangular multimode waveguide.

Next, (2) the relationship between an input beam diameter $\sigma$ and an excited strength $\phi_p(x_u)$ which is the part of Formula 2 indicated by two underlines is shown in FIG. 4.

FIG. 4 shows that the effects under higher order modes are larger in a range where $\sigma/W < 1/5$ due to the small change between the mode orders (the change of excited strength under the zeroth to the fifth mode is about 0.1 or less), and that the effects under higher order modes are smaller in a range where $\sigma/W > 1/5$ due to the greater (reduction) changes as the orders are increased.

Using the above results, now, the relationship between an input condition and an output waveform will be examined below in both of the cases where $\sigma/W < 1/5$ and $\phi/W > 1/5$.

Figure 5:
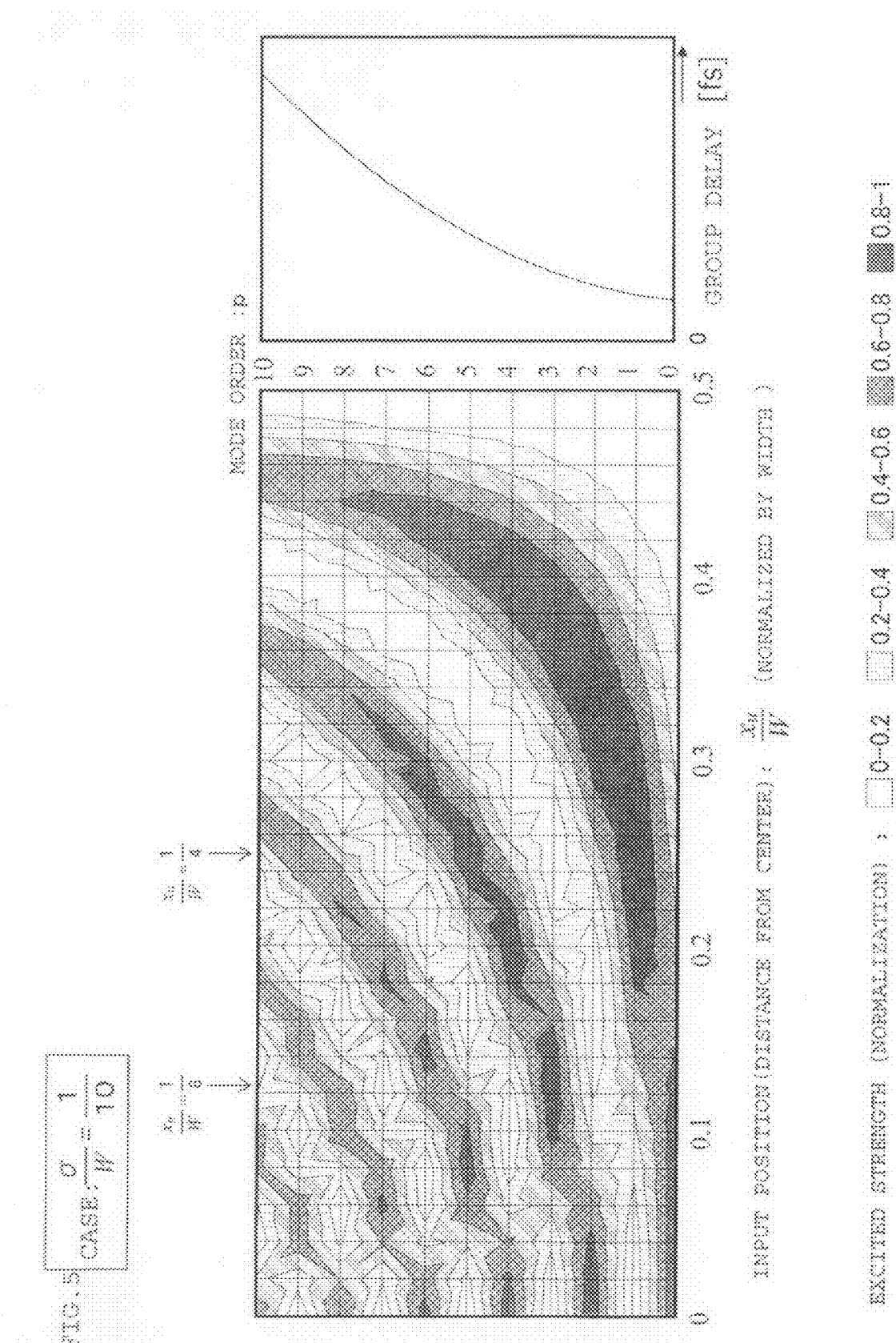
FIG. 5 is a graph showing the relationship between a distance from the center of an input position and an excited strength within a two-dimensional rectangular multimode waveguide when a beam diameter is 1/10 the width of a rectangular multimode waveguide.

As an example of the case where $\phi/W < 1/5$, the relationship between an input position $x_u$ and an excited strength $\phi_p(x_u)$ for the case where $\sigma/W < 1/5$ is shown in FIG. 5.

In this case, at the central input position ($x_u = 0$) under an even order mode excitation, the incident lights are shown as discrete pulses (by assuming the input waveform as pulses) at respective orders, but with the input position $x_u$ moving away from the central position. As the excited strength of the odd order modes increases and the excited strength of the even order modes decreases, around the point of $x_u/W = 1/8$ where the excited strength of the third mode is the local maximum, the combination pulse of the zeroth order mode and the first order mode and the pulse which mainly includes the third mode are the main pulses of the incident light.

With the input position $x_u$ further moving away from the central position, around the point of $x_u/W=1/4$ where the excited strength of the first order mode is the local maximum, the combination pulse from the zeroth order mode to the second order mode which mainly includes the first order mode, and the pulse which mainly includes the fifth mode becomes the main pulses. Then an output waveform of one large pulse in which the principal mode order shifts from a lower order to a higher order appears.

As described above, in the case where $\sigma/W<1/5$, with the input position $x_u$ moving away from the central position ($x_u=0$), the trend of the principal mode order, which contributes to the excitation under the full order modes, changes. That is, the dominant mode of excitation shifts from even orders to odd orders, and then lower orders to higher orders.

This means that an incident light close to the central position excites at almost full order modes including lower order modes, while the incident light farther from the central position (especially at the distance of $x_u/W \geqq 0.34$) excites at higher order modes more than at lower order modes, that is a so-called higher order dominant state.

Therefore, as shown in FIG. 2(B), even as to a light of a longer wavelength (frequency $\omega_1$) having a greater modal group velocity dispersion $\Delta v_{g1}$ over the full order modes excitation, as the input position $x_u$ is moved farther from the central position, the higher order modes dominate the excitation of the light. Thus, the actually measured modal group velocity dispersion $\Delta v_{g1}'$ is reduced, that is, the broadening of the output pulse width of the optical signal can be constrained. Here, when the group velocity of the point $P_1$ which defines the highest mode order and the size of the modal group velocity dispersion $\Delta v_{g1}'$ is read as the input position $x_u$ of an incident light in FIG. 2(B), the $P_1$ can be interpreted as a position which indicates a distance from the input position.

The point $P_1$ in FIG. 2(B) can be interpreted as, a position $P_2$, in FIG. 2(A), which indicates a distance from the input position $x_u$ when the higher order modes dominate the excitation of a light of a frequency $\omega_1$ and the modal dispersion $\Delta \beta_1'$ smaller than the modal dispersion $\Delta \beta_1$ for full order modes excitations is obtained.

When the distance between the input position of a light having a longer wavelength ($\omega_1$) and the central position is controlled so that the size of the modal group velocity dispersion $\Delta v_{g1}'$ approaches that of the modal group velocity dispersion $\Delta v_{g2}$ of the light having a shorter wavelength ($\omega_2$) and having an input position closer to the central position. Thus, a variation in the output pulse widths of each wavelength light can be reduced.

Now, with reference to FIGS. 14(A), 14(B) and 14(C), the change of a modal group velocity dispersion due to the input positions of incident lights in a two-dimensional rectangular multimode waveguide will be schematically described below. For notational convenience, the successive order modes from the lowest order mode (zeroth order mode) to the second order mode were taken as an example.

Figure 14:
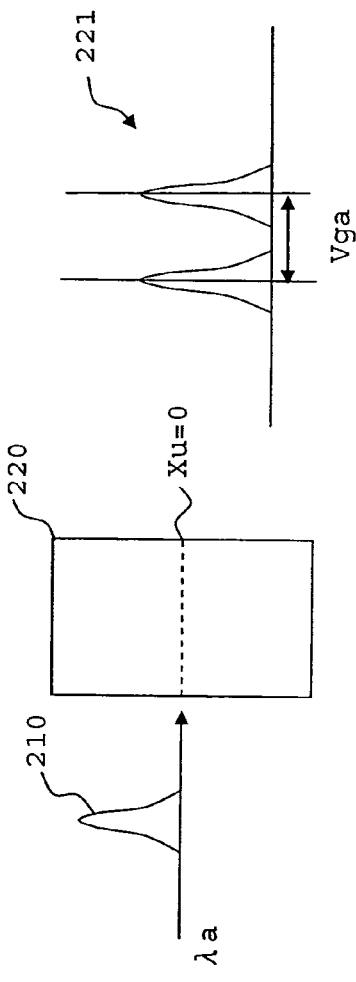
FIG. 14(A) is a schematic diagram illustrating the principle of operation of the present invention.
FIG. 14(B) is a schematic diagram illustrating the principle of operation of the present invention.
FIG. 14(C) is another schematic diagram illustrating the principle of operation of the present invention.
Figure 14:
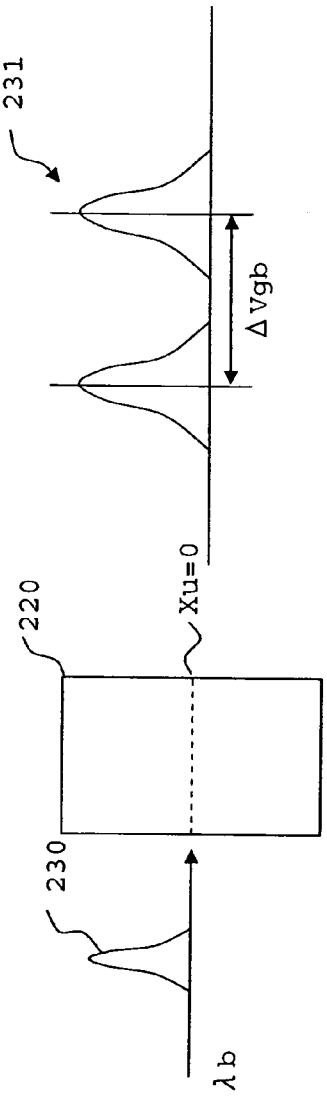
Figure 14:
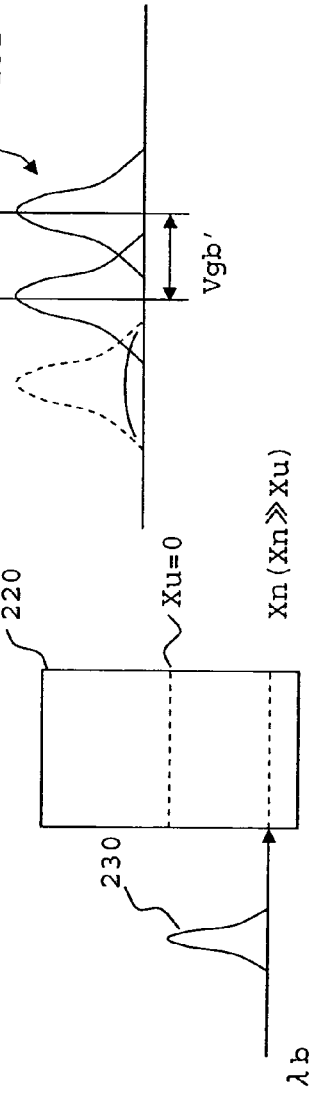

As shown in FIG. 14(A), when an incident light 210 having a pulse of a wavelength $\lambda_a$ is input at the central position $x_u$ ($x_u=0$) of a multimode waveguide 220, a modal dispersion causes the incident light 210 to produce an overlapping light 221 having pulses at a modal group velocity dispersion $\Delta v_{ga}$. As shown in FIG. 14(B), when an incident light 230 having a wavelength $\lambda_b$ longer than the wavelength $\lambda_a$ is input at the same input position as that in FIG. 14(A), the transmission delay of each pulse is increased, and the incident light 230 produces an overlapping light 231 having pulses at modal group velocity dispersion $\Delta v_{gb}$ which is greater than the modal group velocity dispersion $\Delta v_{ga}$. In FIGS. 14(A) and 14(B), the first order mode light is not shown because an odd order mode is not excited at the central position $x_u$.

Due to the wavelength dependence of a modal group velocity dispersion which is described above (the wavelength dependence of a modal dispersion which is dominated by time domain), as shown in FIG. 14(C), even as to an incident light 230 which is the same light as that of FIG. 14(B), when the incident light 230 is input at the input position $x_n$ ($x_n >> 0$) which is apart from the central position of the multimode waveguide 220, in the overlapping light 231', as described above with reference to FIG. 5, since the excitation of the lower order mode (zeroth in this case) light is constrained, it is the higher order mode light including the excited first order mode light that substantially contributes to the modal dispersion. As a result, as to the same wavelength $\lambda_b$, the modal group velocity dispersion $\Delta V_{gb}'$ of the overlapping light 231' is smaller than the modal group velocity dispersion $\Delta V_{gb}$ which is obtained with the input position being at the central position $x_u$ of the multimode waveguide 220. In the case shown in FIG. 14(C), the excitation of a lower (zeroth) order mode light is constrained, and the state in which higher orders dominate shown in FIG. 2(B) is achieved.

As described above, the present invention is directed to using an excited strength of an excitation mode based on the dependence of an input position to a multimode waveguide to compensate for the wavelength dependence of a modal group velocity dispersion (the wavelength dependence of a modal dispersion which is dominated by time domain).

The spread group delay which is spread according to the spread frequency spectrum of an input waveform constrains the discrete output waveforms in each excitation mode (the group delay difference remains the same, but the waveforms are spread and overlapped to each other, which forms a combined waveform). A smooth output waveform is obtained by the overlapped waveforms in each excitation mode, but since the effect of the modal group velocity dispersion is larger than the effect of the spread frequency spectrum, the effect on the pulse width of the output waveform due to the spread frequency spectrum is almost negligible.

Figure 6:
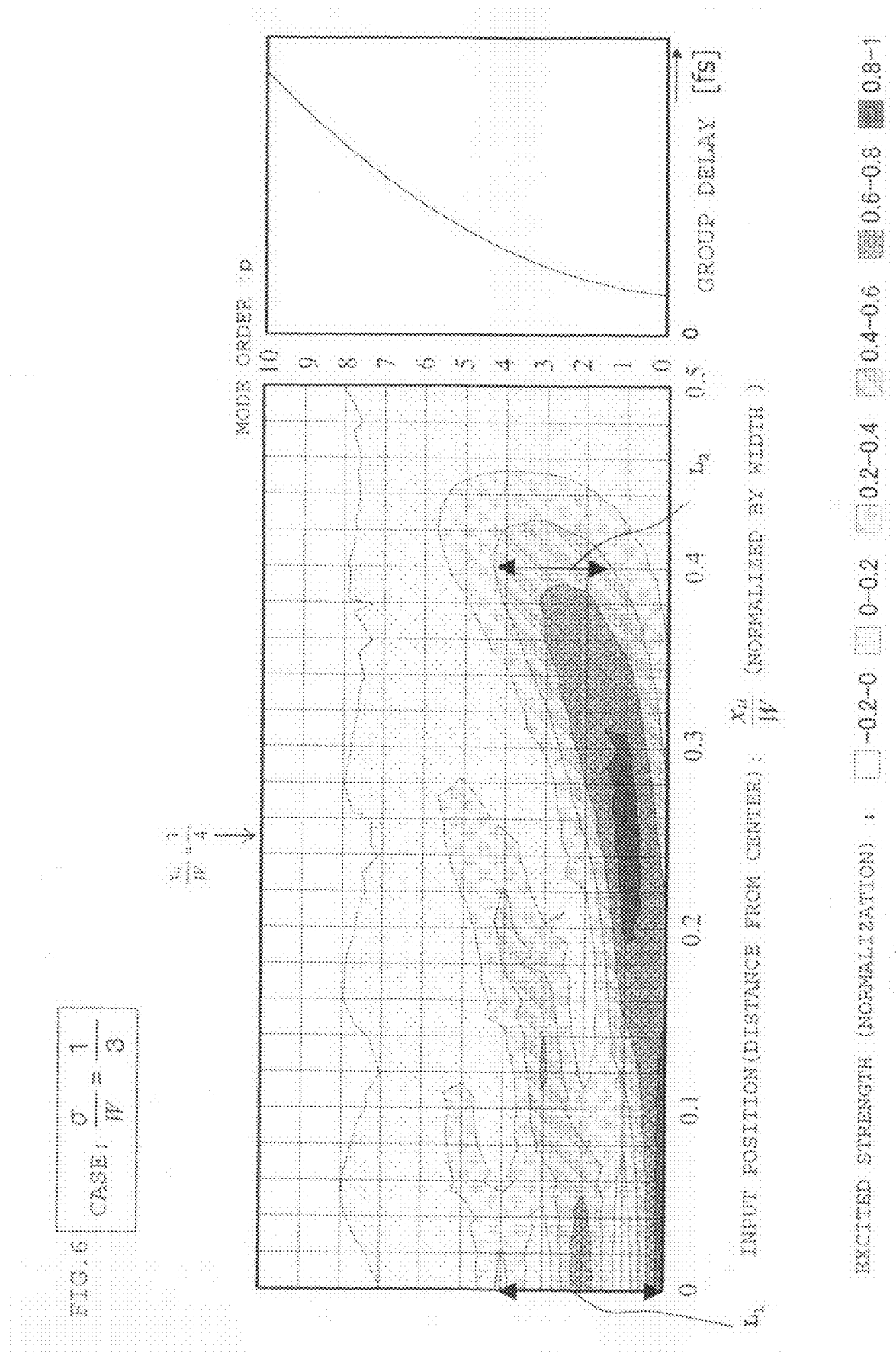
FIG. 6 is a graph showing the relationship between a distance from the center of an input position and an excited strength within a two-dimensional rectangular multimode waveguide when a beam diameter is 1/3 the width of a rectangular multimode waveguide.

Next, as an example of the case where $\sigma/W>1/5$, the relationship between an input position $x_u$ and an excited strength $\phi_p(x_u)$ for the case where $\sigma/w=1/3$ is shown in FIG. 6.

A light which is input at the central position ($x_u=0$) under an even order mode excitation produces discrete pulses in each order as in the same manner as in the case where $\sigma/W<1/5$. Because the excited strength of higher order modes is small, the effect of the third or more order mode is almost negligible as compared to that of the first order mode.

With the input position $x_u$ moving away from the central position, the excited strength of the first order mode is increased and the excited strength of even order modes tends to be decreased. Thereby around the point of $x_u/W=1/4$ where the excited strength of the first order mode is local maximum, the combination pulse from the zeroth order mode to the second order mode which mainly includes the first order mode become the main pulses. With the input position $x_u$ moving further away from the central position, as the excited strength of the zeroth and first order modes is decreased, a smooth output waveform is obtained in which the excited strength difference between the second or the higher order modes is small and the lower order mode dominates. Therefore, the output pulse width with respect to the input position $x_u$ in this case changes to have the local minimum around the point of x/W=1/4 where the first order mode is the local maximum with the increase of the input position $x_u$. However, even at the input position beyond the local minimum value, the modal group velocity dispersion of the order for the excited strength is smaller than the modal group velocity dispersion which is obtained when the excitation of even order modes dominates at the central position.

For example, when a light is input at the central position, the distribution of discrete pulses for a significant excited strength is expressed by the mode distribution range L1 in FIG. 6, while, with respect to the input position 0.4 where the change of the output pulse width goes beyond the local minimum point, the first to fourth order modes for a significant excited strength is expressed by the mode distribution range L2 which is smaller than the range L1.

Thus, the relationship between an input position and a modal group velocity dispersion is maintained, that is, the modal group velocity dispersion of an input light at an input position $x_u$ becomes smaller with the input position $x_u$ being moved farther from the central position than that at the central position.

As described above in each case, on the assumption that the full order modes excitations, that is, the all order modes have the stationary excited strengths, the output pulse width is equal to the time difference which is calculated using the group velocity difference (modal group velocity dispersion $\Delta v_g$) between the lowest mode order and the highest mode order shown in FIG. 2(B). The output pulse width, however, in the case where the excited strength of each order mode is changed by taking the incident light conditions (an input position $x_u$ and an input beam diameter σ) in consideration is equal to the time difference which is calculated using the modal group velocity dispersion as described above with reference to FIG. 3 to FIG. 6, where the latter time difference is not equal to the former one. That is, the output pulse width on the assumption of full order modes excitation is not equal to that by taking the actual incident light conditions in consideration.

Figure 7:
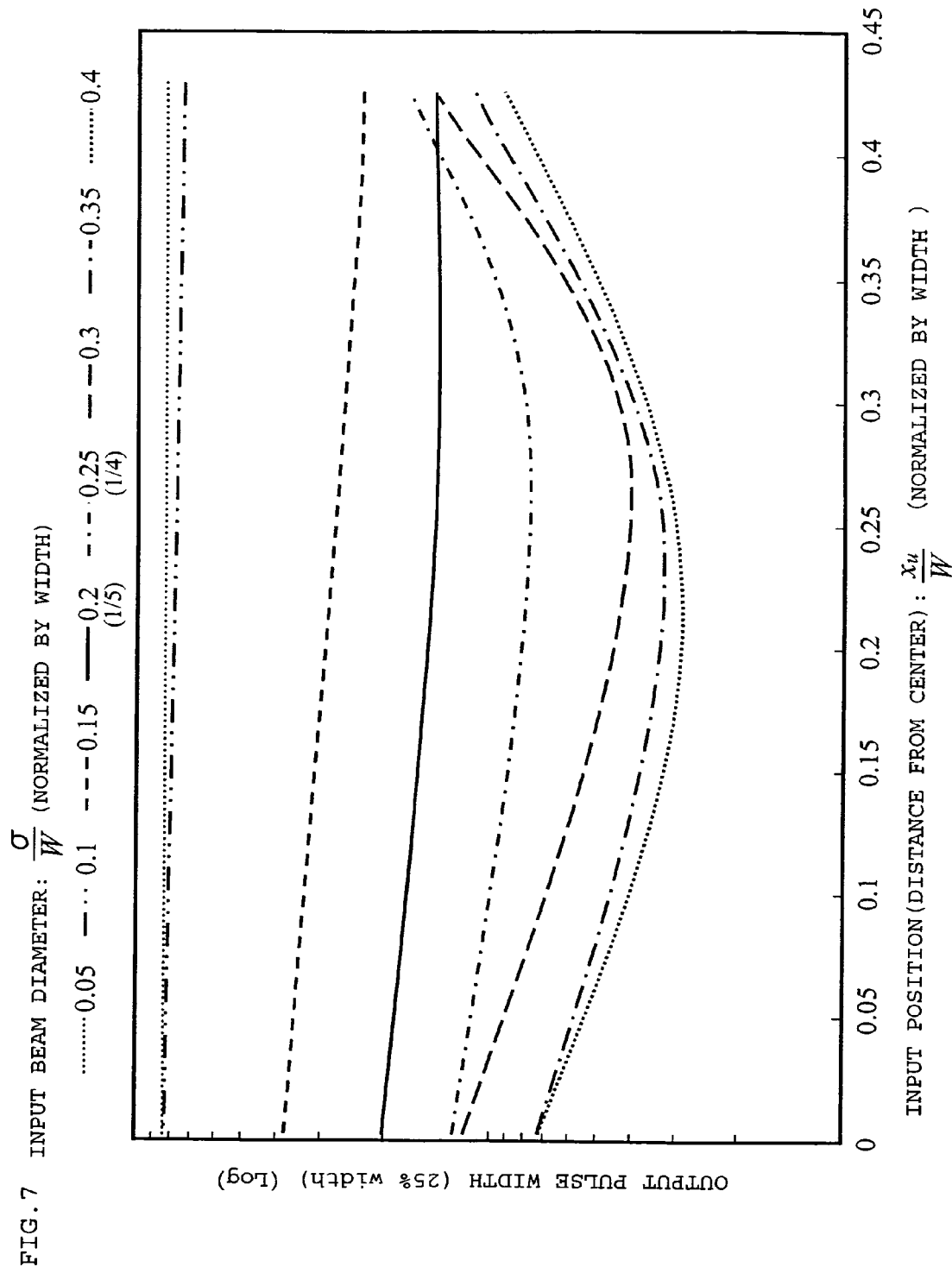
FIG. 7 is a graph showing the relationship between a condition of incident lights (input positions, input beam diameter) and a width of an output pulse within a two-dimensional rectangular multimode waveguide.

Next, the relationship between the incident light conditions (an input position $x_u$ and an input beam diameter σ) and an output pulse width is shown in FIG. 7. Here, the output pulse width means the time period from the time point when the width goes beyond 25% of the peak value of the pulse to the time point when the width falls below 25% of the peak value of the pulse.

As seen from FIG. 7, a point where the input beam diameter σ/W=1/5 to 1/4 divides the change of output pulse width with respect to the $x_u$/W into a monotonic decrease part and the local minimum value part. This is consistent with the result that, in FIG. 4, the effect of higher order modes is greater with the input beam diameter σ/W>1/5, while the effect of higher order modes is smaller with the input beam diameter σ/W<1/5.

In the structure of Embodiment 1 shown in FIG. 1, the input beam diameter σ/W<1/6 causes the output pulse width in the rectangular multimode waveguide 1 to monotonically decrease with respect to the value $x_u$/w.

Meanwhile, as described above with reference to FIG. 2(B) and FIGS. 14(A) to 14(C), since a modal group velocity dispersion is greater with a longer wavelength, a light having a relatively longer wavelength is input to a position farther from the center, so that the broadening effect on the pulse width due to the wavelength dependence of a modal group velocity dispersion can be compensated by the excited strength of the excitation mode which changes depending on the dependence of the input position onto the multimode waveguide, that is the incident light conditions. The effect of the broadened pulse width caused by the group velocity dispersion, results in that a variation in pulse widths between channels can be constrained.

The pulse width affected by the above two factors can be expressed by the product (X)(Y) of a function (X) of the broadening degree of an output pulse width due to the wavelength dependence of a modal group velocity dispersion and a function (Y) of the broadening degree of an output pulse width due to the excited strength of an excitation mode and a group velocity dispersion which change depending on incident light conditions. The function X is a monotonically increasing function X(λ) with respect to a wavelength λ, while the function Y is a monotonically decreasing function $Y(x_u)$ with respect to an input position $x_u$ separated from the central position. Thereby a light having a longer wavelength is input to a position separated farther from the central position, so that, among a plurality of output lights for the incident light having a plurality of different wavelengths, the maximum output pulse width can be set by combining an appropriate wavelength and an appropriate input position for the minimum.

When a multimode waveguide for coupling has a structure in which the distances between the center in the width direction thereof and each of a plurality of input positions are different from each other, lights can be input to the input positions depending on the wavelengths thereof as described above. For a more efficient coupling mode interference, a multimode waveguide desirably has a structure in which a plurality of input position are symmetrically disposed about the central axis 7, as in the case of the rectangular multimode waveguide 1 of FIG. 1 in this Embodiment. In such a structure, all of the incident lights may be arranged to satisfy the condition: that is, as to the two lights having adjacent wavelengths, the distance from the central position to the input position of the incident light having a longer wavelength is equal to or more than that of the incident light having a shorter wavelength. When the input position of each incident light is determined in this manner, the incident light having a longer wavelength is not possibly input to a position closer to the central axis 7 as compared to the position of the incident light having a shorter wavelength.

In Embodiment 1, the input position control unit 4 switches the positions of the output ends 17 for automatically inputting the first to sixth input waveguides 21 to 26 depending on the wavelengths of the incident lights 3, but because each of the incident lights are only required to be input to the rectangular multimode waveguide 1 according to the above described conditions, the input position control unit 4 may be simply be configured as an optical switch, so that a person may manually switches the optical switch depending on the wavelengths of the incident lights.

The input position control unit 4 may not have the switching function, but may only output the incident lights 3, after the lights are individually input to the input ends 16, to the output end 17 which are fixedly assigned to the input ends 16 respectively. With respect to also as the light source for inputting the incident lights 3 to the input position control unit 4, a wavelength variable light source may be used, so that the above relationship between a wavelength and an input position is satisfied when the wavelength variable light source changes the wavelengths of each of the incident lights.

Figure 8:
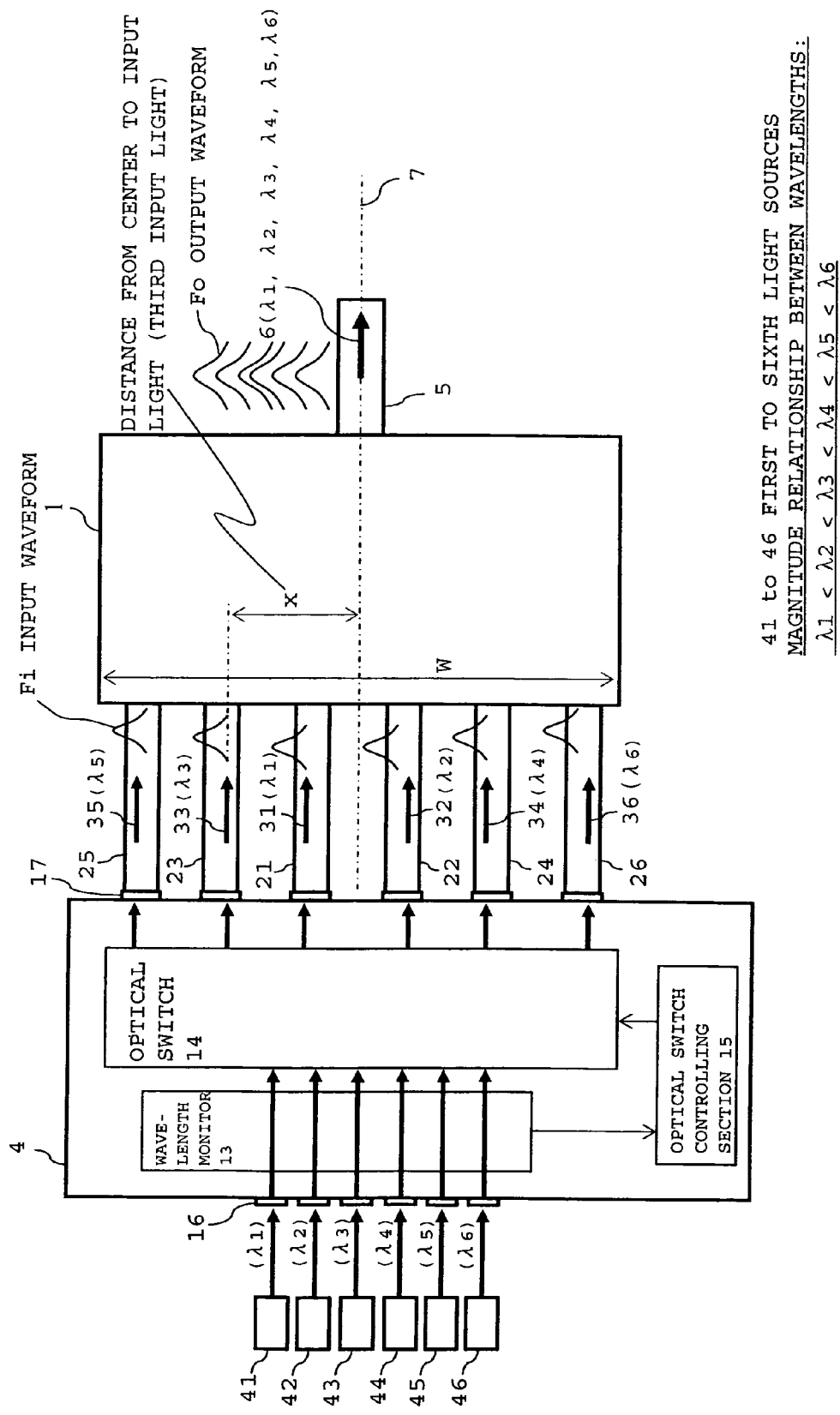
FIG. 8 is a configuration diagram showing a wavelength multiplexed light source having another structure according to Embodiment 1 of the present invention.

FIG. 8 is a configuration diagram showing a wavelength multiplexed light source having another structure according to Embodiment 1 of the present invention. The same elements as those of FIG. 1 are designated by the same reference numerals.

The wavelength multiplexed light source has the same structure as that of FIG. 1, except the six incident lights 3 to the input position control unit 4 are input from first to sixth light sources 41 to 46 which have a modulation controlling function to cause the light output to be delayed.

In FIG. 1 and FIG. 8, the input waveform Fi schematically illustrates the relative peak time of each of the incident lights 31 to 36 which is input to the rectangular multimode waveguide 1, and the output waveform Fo schematically illustrates the relative peak time of the six optical signals when the signals are output from the rectangular multimode waveguide 1 to the output waveguide 5.

As shown in the reference graphs of FIGS. 3 to 6, since a mode order and a group delay have a positive correlation with each other, a replacement of the vertical axis for the mode order of FIG. 5 and FIG. 6 with the one for a time frame allows a qualitative change of the output waveform Fo over time to be indicated. Therefore, as seen from FIG. 5 and FIG. 6, the peak time of the output waveform Fo delays as the distance $x_u/W$ from the central position increases (the peak time has a positive correlation with the distance).

Therefore, in the case where the first to sixth incident lights 31 to 36 which have the same peak time as shown in FIG. 1 are input to the rectangular multimode waveguide 1, when the lights are output from the rectangular multimode waveguide 1, the light which is input to the position farther from the central axis 7 is output later, which results in staggered peak times of the output lights.

To the contrary, in the wavelength multiplexed light source shown in FIG. 8, in the first to sixth light sources 41 to 46 for supplying six incident lights 3 to be input to the input position control unit 4, the supply of an incident light which is input to the position closer to the central position of the rectangular multimode waveguide 1, that is an incident light having a shorter wavelength, is controlled to be delayed using modulation control such as direct modulation and external modulation, to emit the incident lights 3 to the input position control unit 4.

In the case of FIG. 8, a pair of the first incident lights 31 of the wavelength $\lambda_1$ and the second incident lights 32 of the wavelength $\lambda_2$, a pair of the third incident lights 33 of the wavelength $\lambda_3$ and the fourth incident lights 34 of the wavelength $\lambda_4$, and a pair of the fifth incident lights 35 of the wavelength $\lambda_5$ and the sixth incident lights 36 of the wavelength $\lambda_6$ are individually input to the positions which are located at the same distance from the central axis 7, and are input in order of closeness to the central axis 7. Therefore, the first light source 41 for emitting a light of the wavelength $\lambda_1$ and the second light source 42 for emitting a light of the wavelength $\lambda_2$ are controlled to emit the incident lights 3 after the longest delay, and the fifth light source 45 for emitting a light of the wavelength $\lambda_5$ and the sixth light source 46 for emitting a light of the wavelength $\lambda_6$ are controlled to emit the incident lights 3 after the shortest delay.

In this way, the peak times between the wavelengths of the output waveforms can be aligned with each other by delaying the emission of the incident lights by longer time, which are input to the rectangular multimode wave-guide 1, the position closer to the central axis 7.

When a wavelength multiplexing transmission is used in an optical bus, the transmitted wavelengths should be synchronized with each other. In such a case, a wavelength multiplexed light source having a structure of FIG. 8 may be used to input a shorter wavelength of a small group velocity delay to a multimode waveguide for coupling after the longer delay, and input a longer wavelength of a large group velocity delay to the multimode waveguide for coupling after the relatively shorter delay, so that wavelengths can be synchronized with each other.

In this way, when a wavelength multiplexing transmission is used in an optical bus, the synchronization between channels eliminates any rearrangement of signals at the receiving side, which may reduce a burden of the receiving side and may increase a transmission speed.

In the structure of FIG. 8, the emissions of the incident lights 3 to the input position control unit 4 are delayed using the modulation control of the first to sixth light sources 41 to 46, but other methods may be used to obtain a similar effect as far as the emissions to the rectangular multimode waveguide 1 can be individually delayed, depending on the wavelengths of the lights. For example, a waveguide in which a refractive index and a waveguide shape are designed to have a wavelength dispersion of a slower group velocity for shorter wavelengths may be used as the first to sixth input waveguides 21 to 26.

In Embodiment 1, the number N of the multiplexed light is equal to 6, but Embodiment 1 may be applied to the case of N>6, and also to the case of N=2 to 5 if the input beam diameter a satisfies the relationship σ/W<1/5.

EMBODIMENT 2

Figure 9:
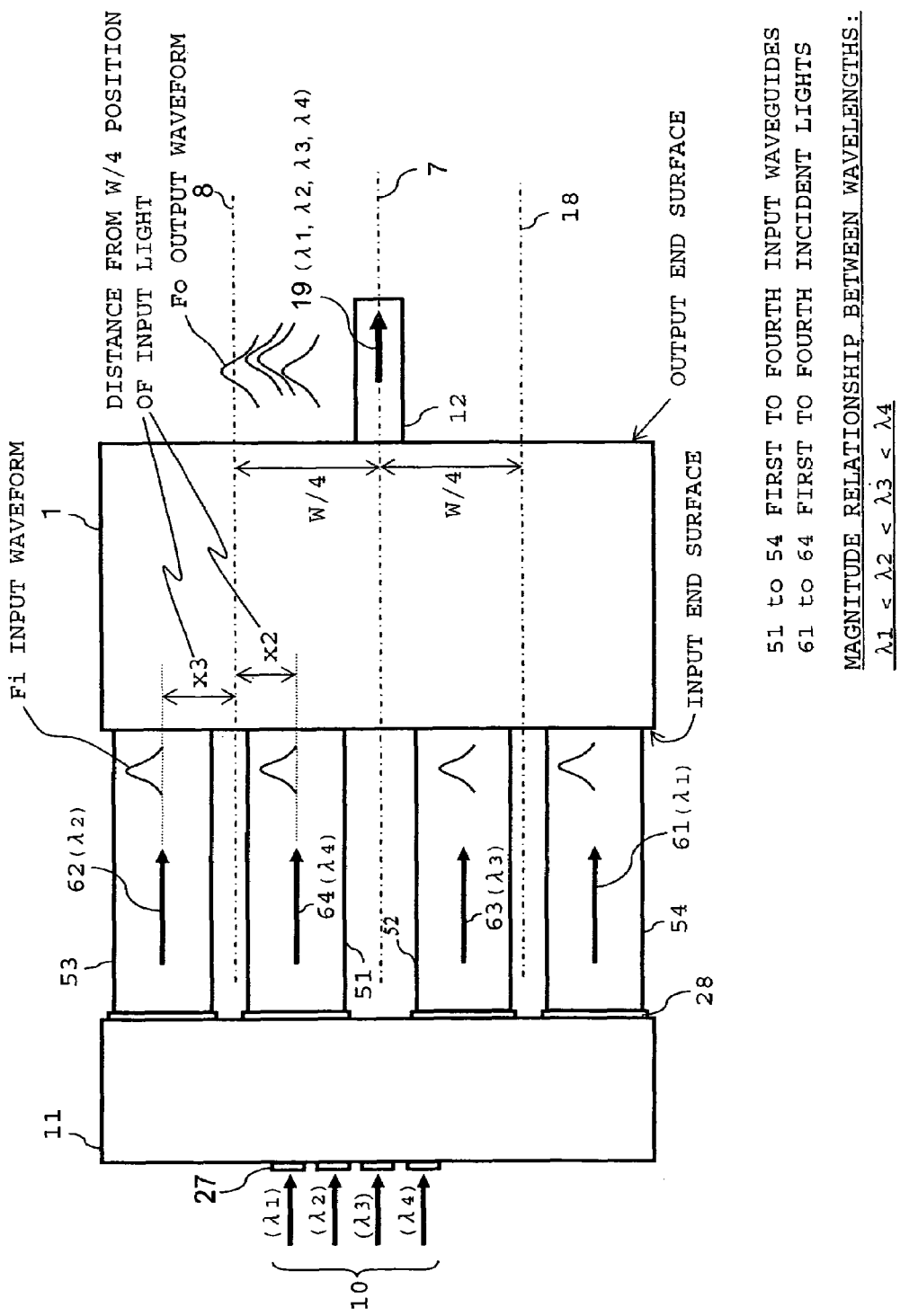
FIG. 9 is a configuration diagram showing a wavelength multiplexed light source according to Embodiment 2 of the present invention.

FIG. 9 is a configuration diagram showing a wavelength multiplexed light source according to Embodiment 2 of the present invention. The same elements as those of FIG. 1 are designated by the same reference numerals.

A wavelength multiplexed light source of Embodiment 2 is an example in which the number N of the multiplexed lights is equal to 4 and the beam diameter of an incident light to the rectangular multimode waveguide 1 satisfies the relationship σ/W>1/5, as shown in FIG. 9.

Now, the sections different from FIG. 1 will be explained below.

The wavelength multiplexed light source of Embodiment 2 includes, as shown in FIG. 9, a rectangular multimode waveguide 1 (width W, optical path length L) having an input end surface, and first to fourth input waveguides 51 to 54 which are connected to the input end surface and are symmetrically located about the central axis 7 in the width direction of the rectangular multimode waveguide 1, the reference numerals of the waveguides being given in order of closeness to the central axis 7. An output waveguide 12 is connected to the output end surface of the rectangular multimode waveguide 1 at a position on the central axis 7.

The first to fourth input waveguides 51 to 54 are waveguides through which a light is transmitted at an amount ratio of input to output of 1:1, and each of them has another end which is connected to an output end 28 of an input position control unit 11 for inputting four incident lights 10 to the first to fourth input waveguides 51 to 54, respectively, depending on the wavelength of the four incident lights 10. The first to fourth input waveguides 51 to 54 are those in which a beam diameter σ of a propagating light satisfies the relationship σ/W>1/5, and have the same waveguide width, which means that the maximum waveguide width of these waveguides is W/4.

The input position control unit 11 has a structure similar to that of the input position control unit 4 shown in FIG. 1 for example, and causes the four incident lights 10 which are input through four input ends 27 and have four different wavelengths to be output from output end 28 corresponding to the wavelengths. Two axes +W/4 axis 8 and −W/4 axis 18 are set at positions which are separated from the central axis 7 of the rectangular multimode waveguide 1 by W/4 on both sides of the central axis 7 in the width direction of the rectangular multimode waveguide 1, and as to the four incident lights 10 input through the input ends 27, the incident light 10 having a longer wavelength is output from the output end 28 to be input to the input waveguide the input position to the rectangular multimode waveguide 1 which is closer to the +W/4 axis 8 or −W/4 axis 18. The phrase "the input position is closer to the +W/4 axis 8 or −W/4 axis 181" as used herein is defined by comparing between the smaller distances from each incident light to the +W/4 axis 8 and −W/4 axis 18.

For example, as shown in FIG. 9, the case where the four incident lights 10, the reference numerals of which are given in order of shortness of wavelength (i.e., the four incident lights which have wavelengths $\lambda_1$ to $\lambda_4$ with the relationship therebetween: $\lambda_1 < \lambda_2 < \lambda_3 < \lambda_4$), are input into the input ends 27.

The distance x2 between the first input waveguide 51 and the +W/4 axis 8 is smaller than the distance x3 between the third input waveguide 53 and the +W/4 axis 8, and the first input waveguide 51 is coupled to the rectangular multimode waveguide 1 at the position closer to the +W/4 axis 8 than the third input waveguide 53. Since the second input waveguide 52 and the fourth input waveguide 54 are coupled to the rectangular multimode waveguide 1 at positions which are symmetrically located relative to the first input waveguide 51 and the third input waveguide 53 respectively about the central axis 7, the second input waveguide 52 is coupled to the rectangular multimode waveguide 1 at the position closer to the −W/4 axis 18 than the fourth input waveguide 54. Therefore, the input position control unit 4 switches the output to the output end 28 so that the fourth to first incident lights 64 to 61 ($\lambda_4$ to $\lambda_1$) are input to the first to fourth input waveguides 51 to 54 respectively.

However, for the most efficient coupling mode interference in the rectangular multimode waveguide 1, as shown in FIG. 9, the rectangular multimode waveguide 1 has a structure in which the input waveguides are symmetrically disposed about the central axis 7. Thereby in the case of the structure shown in FIG. 9, the fourth to first incident lights 64 to 61 which are input to the first to fourth input waveguides 51 to 54 respectively have wavelengths which are shorter in this order. The fourth incident light 64 and the third incident light 63 have the same the distance from the input position of each incident light to the +W/4 axis 8 or the −W/4 axis 18, and the second incident light 62 and the first incident light 61 have the same distance from the input position of each incident light to the +W/4 axis 8 or the −W/4 axis 18.

In Embodiment 2, since the input beam diameter a to the rectangular multimode waveguide 1 satisfies the relationship $\sigma/W > 1/5$, with reference to FIG. 7 which was used in the above description of Embodiment 1, the input position $x_u$ on the input end surface of the rectangular multimode waveguide 1 has the relationship with an output pulse width so that the output pulse width has a local minimum value with $x_u/W = \pm W/4$.

Therefore, the fourth incident light 64 and the third incident light 63 which have larger modal group velocity dispersions and longer wavelengths are input to the first input waveguide 51 and the second input waveguide 52 ($x_u = x2$), the input positions of which are located closer to the +W/4 axis 8 and the −W/4 axis 18 respectively. The second incident light 62 and the first incident light 61 which have smaller modal group velocity dispersions and shorter wavelengths are input to the third input waveguide 53 and the fourth input waveguide 54, the input positions of which are located farther from the +W/4 axis 8 and the −W/4 axis 18 respectively. Thus, the broadening effect on the output pulse width due to a group velocity dispersion of a wavelength can be compensated by the excited strength of the excitation mode, which changes depending on the incident light conditions and the effect of the broadened pulse width caused by the group velocity dispersion. That is, the wavelength dependence of a modal group velocity dispersion (the wavelength dependence of a modal dispersion which is dominated by time domain) is compensated by the dependence of an input position to a multimode waveguide, which results in that a variation in output pulse widths broadening between channels can be constrained.

When a multimode waveguide for coupling has a structure in which the distances between the position apart from the center in the width direction thereof by +W/4 and each of a plurality of input positions are different from each other (among the distances from each input position to the +W/4 and −W/4, the shorter distances are compared), a light having a longer wavelength can be input to the input position which is closer to the position apart from the center by ±W/4, For a more efficient coupling mode interference, a multimode waveguide desirably has a structure in which a plurality of input positions are symmetrically disposed about the central axis 7, as in the case of the rectangular multimode waveguide 1 of FIG. 9. In such a structure, all of the incident lights may be arranged to satisfy the condition: that is, as to the two lights having adjacent wavelengths, the distance from the position apart from the central axis 7 by ±W/4 to the input position of the incident light having a longer wavelength is equal to or less than that of the incident light having a shorter wavelength. When the input position of each incident light is determined in this manner, the incident light having a longer wavelength will not be input to a position farther from the position apart from the central axis 7 by ±W/4 as compared to the position of the incident light having a shorter wavelength.

Figure 10:
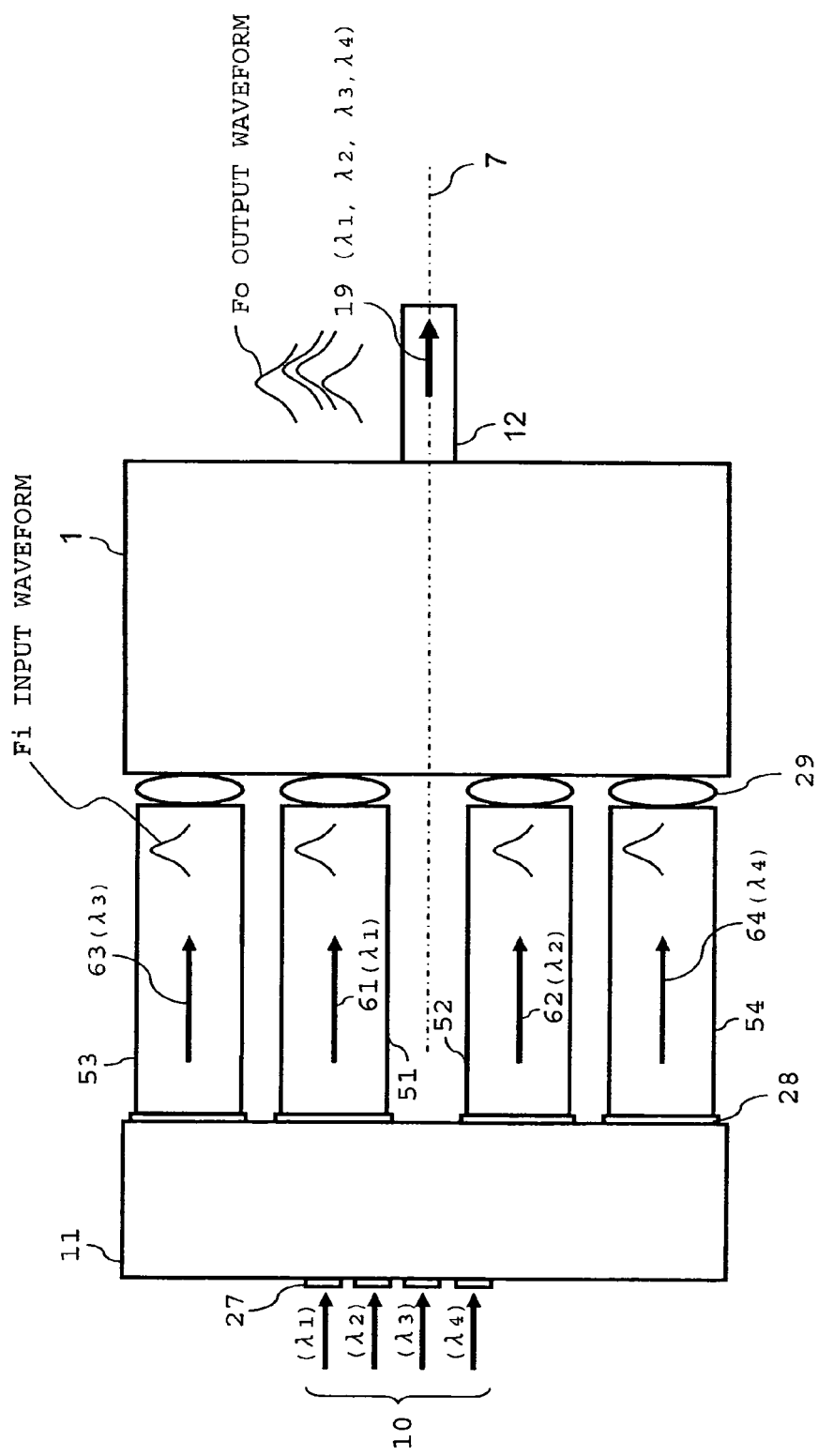
FIG. 10 is a configuration diagram showing a wavelength multiplexed light source having another structure according to Embodiment 2 of the present invention.

FIG. 10 is a configuration diagram showing a wavelength multiplexed light source having another structure according to Embodiment 2 of the present invention. The same elements as those of FIG. 9 are designated by the same reference numerals.

A wavelength multiplexed light source shown in FIG. 10 has the same structure as that of FIG. 9, except that lenses 29 for beam diameter controlling are provided between each of the ends of the first to fourth input waveguides 51 to 54 and the input end surface of the rectangular multimode waveguide 1.

The beam diameters C of the first to fourth incident lights 61 to 64 which propagate through the first to fourth input waveguides 51 to 54 satisfy the relationship $\sigma/W > 1/5$ as in the case of FIG. 9, but across the lenses 29, the beam diameters $\sigma$ of the first to fourth incident lights 61 to 64 are changed to satisfy the relationship $\sigma/W < 1/5$ to be input to the rectangular multimode waveguide 1.

Since the input first to fourth incident lights 61 to 64 has the beam diameters $\sigma$ that satisfy the relationship $\sigma/W < 1/5$, the output pulse width within the rectangular multimode waveguide 1 more monotonically decreases relative to $x_u/W$, which is similar to that of Embodiment 1 as compared to FIG. 7.

Therefore, in this case, the input position control unit 11 controls to cause the four incident lights 10 input through the input ends 27 to be output from each of the output ends 28 so that, among the first to fourth incident lights 61 to 64, a light having a shorter wavelength is input to the input waveguide, the input position to the rectangular multimode waveguide 1 of which is located closer to the central axis 7. That is, in this case, the first to fourth incident lights 61 to 64 are output from the output ends 28 so that the first to fourth incident lights 61 to 64 are input to the first to fourth input waveguides 51 to 54 respectively, the first to fourth input waveguides 51 to 54 being connected in order of closeness to the central axis 7 of the input end surface of the rectangular multimode waveguide 1.

Thus, even in the case N<5, when a beam diameter a satisfies the relationship σ/W<1/5 using a beam changing function before input, as in the case of Embodiment 1, since an output pulse width monotonically decreases relative to an input beam diameter $x_d/W$, an input wavelength can be determined using a distance from the central axis. That is, the positioning of a light having a relatively longer wavelength and a larger modal group velocity dispersion apart from the center allows the broadening effect on the pulse width due to a group velocity dispersion of a wavelength to be compensated by the excited strength of the excitation mode which changes depending on the incident light conditions and the effect of the broadened pulse width caused by the group velocity dispersion. In other words, the wavelength dependence of a modal group velocity dispersion (the wavelength dependence of a modal dispersion which is dominated by time domain) is compensated by the dependence of an input position to a multimode waveguide, which results in that a variation in output pulse widths broadening between channels can be constrained.

The lenses 29 are an example of a beam diameter control unit of the present invention.

In FIG. 10, the lenses 29 are provided between the first to fourth input waveguides 51 to 54 and the rectangular multimode waveguide 1 as a beam changing function, but the beam changing function may be provided at another position as long as a beam diameter a of a light input to the rectangular multimode waveguide 1 can be changed to satisfy the relationship σ/W<1/5. Specifically, the beam changing function may be provided at any position between the input ends 27 of the input position control unit 11 and the input end surface of the rectangular multimode waveguide 1.

Also, the lenses 29 as a beam changing function may be concavo-convex lenses or GRIN lenses, which may be used for controlling the distances between the first to fourth input waveguides 51 to 54. The rectangular multimode waveguide 1, or refractive indexes of the lenses 29 and the first to fourth input waveguides 51 to 54 can be controlled using a temperature or an electric field so that the first to fourth incident lights 61 to 64 have desired beam diameters as needed.

Alternatively, the waveguide widths of the first to fourth input waveguides 51 to 54 may be reduced or a refractive index difference between the core and the clad may be increased to cause the beam diameter σ of a light input to the rectangular multimode waveguide 1 to be changed to satisfy the relationship σ/W<1/5 and the beam changing function to be realized.

In the structure of FIG. 9, when the first to fourth incident lights 61 to 64 output from the input position control unit 11 are input to the rectangular multimode waveguide 1 without changing the beam diameters thereof, the input position control unit 11 may be provided with a function to detect the beam diameters, in addition to the wavelengths of the incident lights 10 so that the positions of the output end 28 from which the lights 10 are output can be switched depending on the wavelengths and beam diameters.

In this case, the input position control unit 11 controls to cause the lights 10 to be output from the output ends 28. In this manner, a light having a longer wavelength is input to the input waveguide the input position to the rectangular multimode waveguide 1 of which is located closer to the +W/4 axis 8 or the −W/4 axis 18 when the beam diameter σ of the incident light 10 satisfies the relationship σ/W>1/5, and when the beam diameter σ of the incident light 10 satisfies the relationship σ/W<1/5, a light having a shorter wavelength is input to the input waveguide the input position to the rectangular multimode waveguide 1 which is located closer to the central axis 7.

Such controlling allows the first to fourth incident lights 61 to 64 to be input to the most appropriate position of the input end surface of the rectangular multimode waveguide 1 depending on the wavelength and beam diameter of the incident light 10.

EMBODIMENT 3

Figure 11:
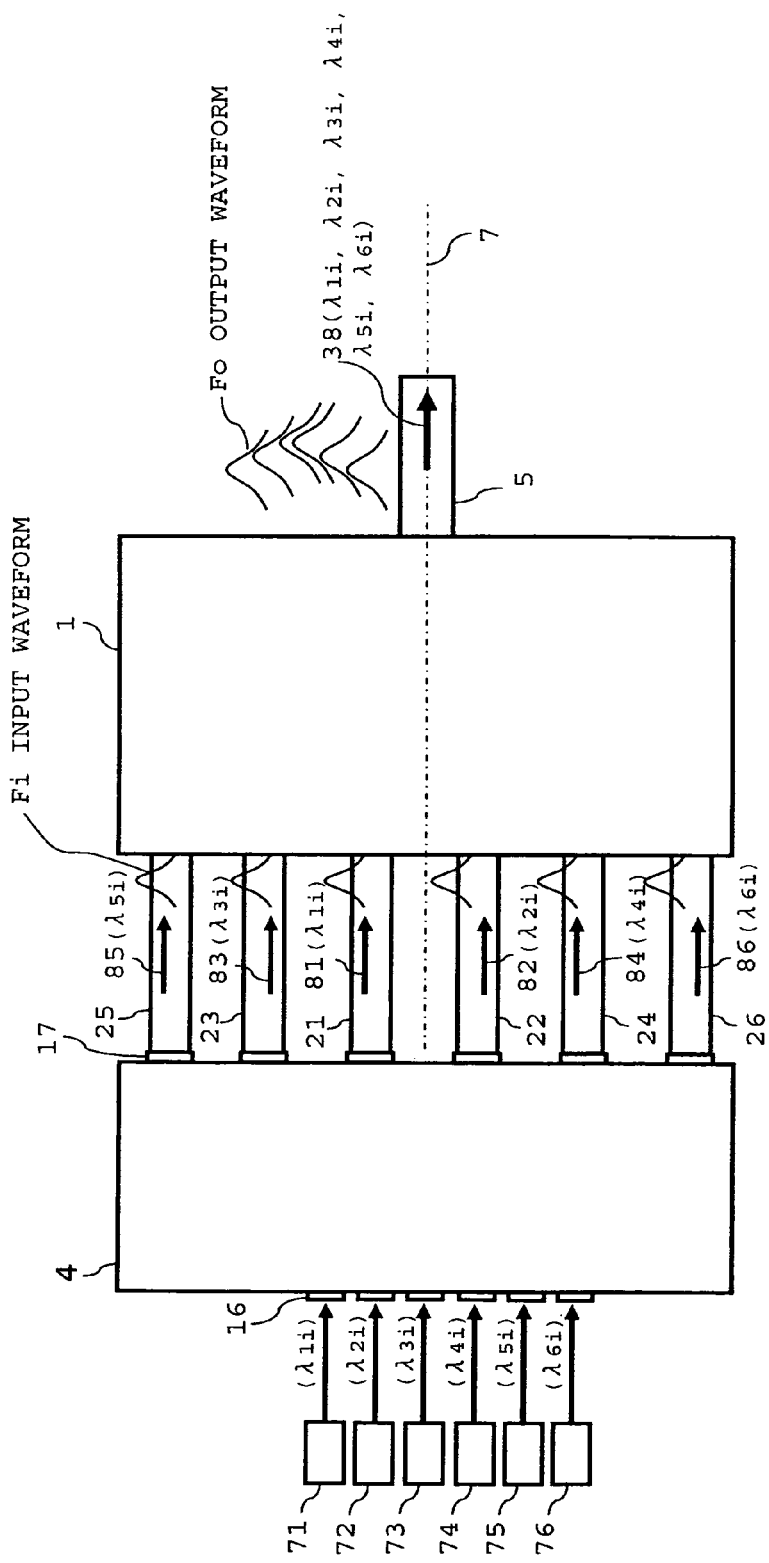
FIG. 11 is a configuration diagram showing a wavelength multiplexed light source according to Embodiment 3 of the present invention.
Figure 12:
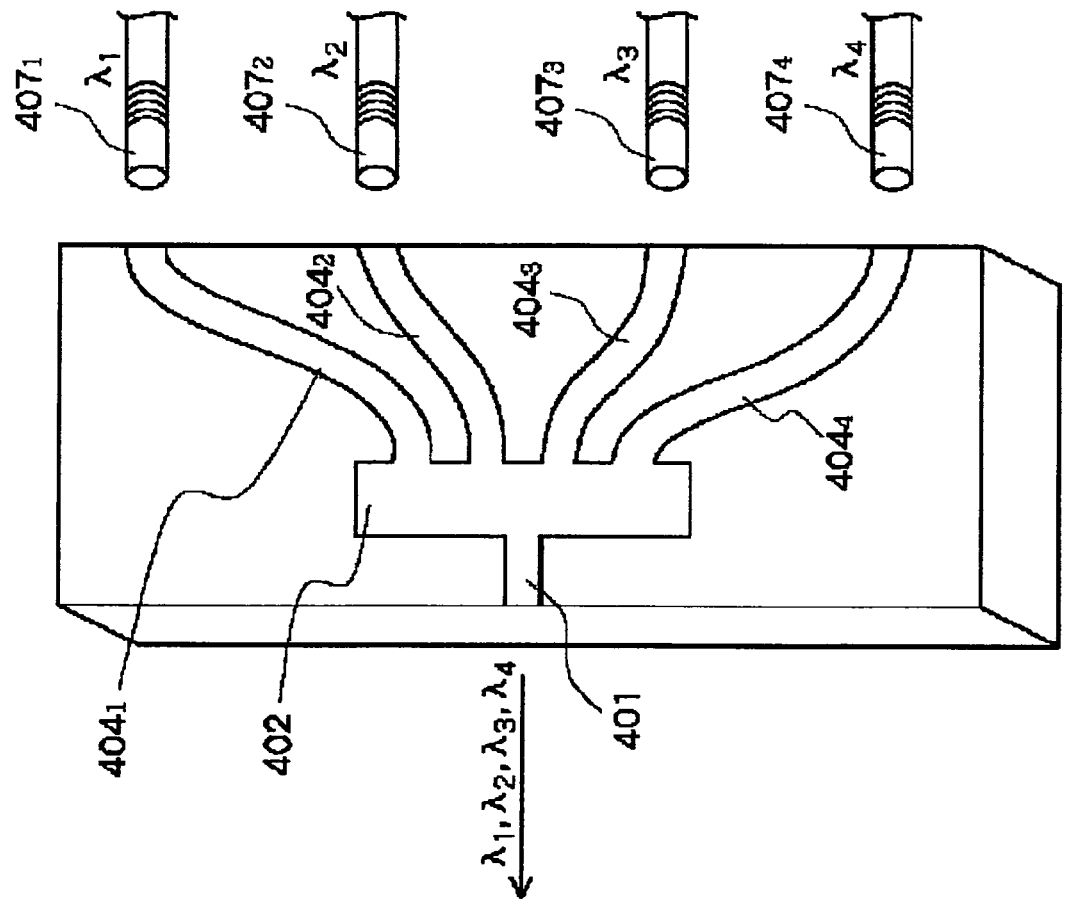
FIG. 12 is a perspective diagram showing a conventional wavelength multiplexed light source.
Figure 13:
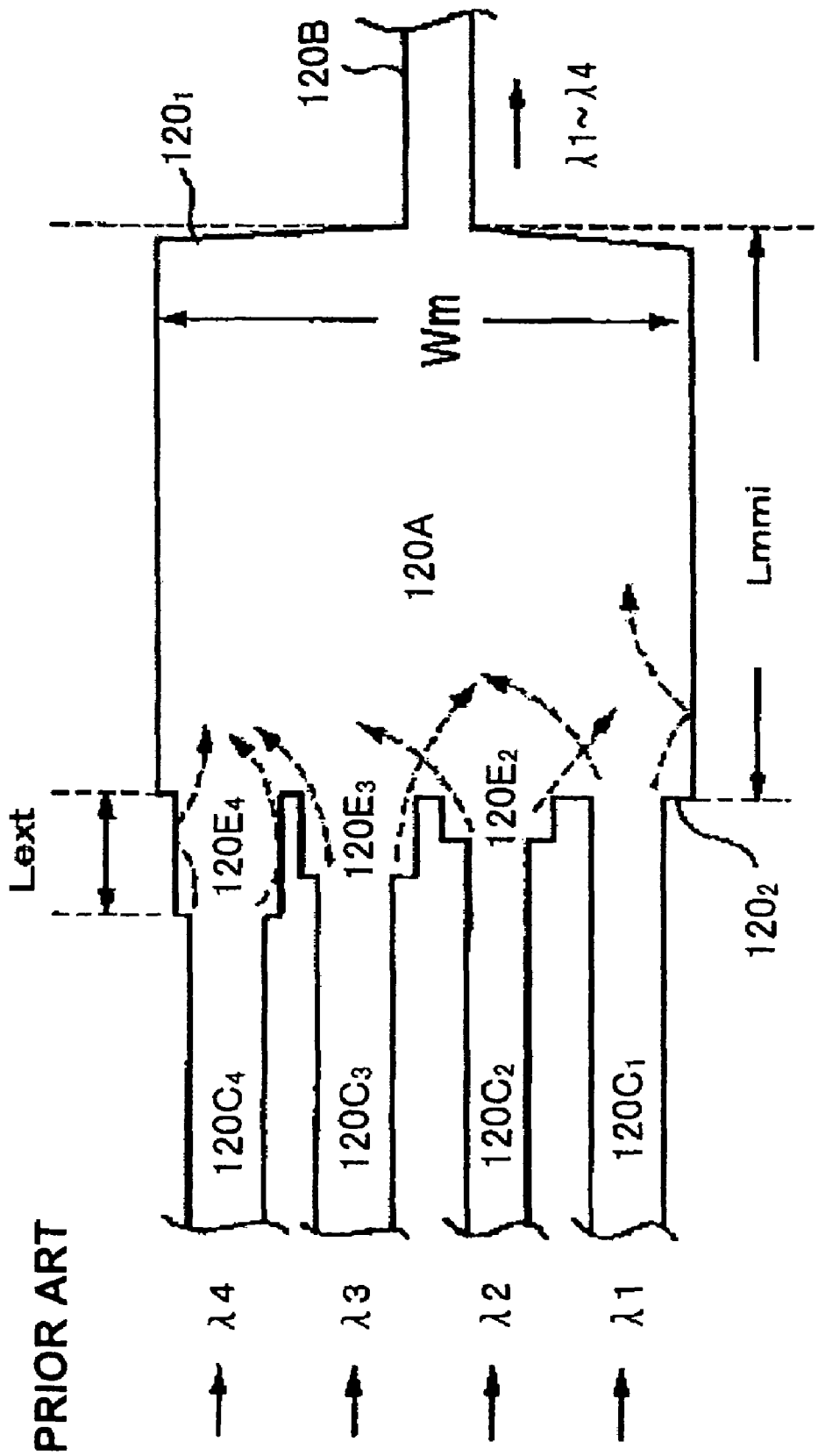
FIG. 13 is a two-dimensional diagram showing a structure of a conventional optical coupler.

FIG. 11 is a configuration diagram showing a wavelength multiplexed light source system according to Embodiment 3 of the present invention. The same elements as those of FIG. 1 are designated by the same reference numerals.

A wavelength multiplexed light source system of Embodiment 3 is an example of a wavelength multiplexed light source system for the N number of multiplexed lights. The number N=36 is obtained by connecting the wavelength multiplexed light source system for the N number of multiplexed lights where N=6 of Embodiment 1 shown in FIG. 1 in multi-stages.

The first to sixth wavelength multiplexed light sources 71 to 76 are those shown in FIG. 1 respectively, and are configured to cause the wavelength multiplexed lights as outputs from the wavelength multiplexed light sources to be input to the input position control unit 4 of the wavelength multiplexed light sources shown in FIG. 1.

Into the six input ends 16 of the input position control unit 4, six wavelength multiplexed incident lights (λji) (i, j=1, 2, 3, 4, 5, 6; the larger j means a longer wavelength) are input respectively from the $j^{th}$ wavelength multiplexed incident light source (i.e., the first to sixth wavelength multiplexed light sources 71 to 76).

The input position control unit 4 divides the six wavelength multiplexed incident lights input from the input ends 16 into groups according to the order of wavelength (j). Control unit 4 controls to cause the first to sixth wavelength multiplexed incident lights 81 to 86 to be output from the output ends 17 so that the wavelength multiplexed lights of a group having shorter wavelengths are input to the input waveguides the input positions to the rectangular multimode waveguide 1 of which are located closer to the central axis 7. That is, in this case, the first to sixth wavelength multiplexed incident lights 81 to 86 (λ1i to λ6i) are output from the output ends 17 so that the first to sixth wavelength multiplexed incident lights 81 to 86 (λ1i to λ6i) are input to the first to sixth input waveguides 21 to 26, respectively, which are connected in an order of closeness to the central axis 7 of the input end surface of the rectangular multimode waveguide 1.

The first to sixth wavelength multiplexed incident lights 81 to 86 desirably have wavelength ranges which are different from each other and do not overlap each other. The wavelength ranges which do not overlap each other allow the resulting maximum output pulse width to be the shortest. Specifically, for example in FIG. 11, when the first wavelength multiplexed incident light 81 includes lights which have wavelengths with the relationship $\lambda_{11}<\lambda_{21}<\lambda_{31}<\lambda_{41}<\lambda_{51}<\lambda_{61}$, and the second wavelength multiplexed incident light 82 includes lights which have wavelengths with the relationship $\lambda_{12}<\lambda_{22}<\lambda_{32}<\lambda_{42}<\lambda_{52}<\lambda_{62}$, the wavelength ranges of the first wavelength multiplexed incident light 81 and the second wavelength multiplexed incident light 82 are set to have the relationship $\lambda_{61}<\lambda_{12}$. The same setting is applied to the third wavelength multiplexed incident light 83 to sixth wavelength multiplexed incident light 86 to obtain wavelength ranges which are different from each other and do not overlap each other.

Also, in FIG. 11, the wavelength multiplexed light sources are configured in two stages, but the wavelength multiplexed light sources of Embodiment 1 shown in FIG. 1 may be configured in three or more stages.

The larger width of the rectangular multimode waveguide 1, that is the more number of incident lights into the rectangular multimode waveguide 1 increases the resulting modal group velocity dispersion. After dividing the lights into groups depending on the wavelengths, using the rectangular multimode waveguide 1 having a plurality of smaller modal group velocity dispersions, the group of lights having longer wavelengths are input to the input positions to the rectangular multimode waveguide in multi-stages which are located farther from the center, which results in that a variation in the output pulse widths between the longer wavelength group and the shorter wavelength group can be constrained.

In Embodiment 3, the first to sixth wavelength multiplexed light sources 71 to 76 are the wavelength multiplexed light sources having the same structure as that of Embodiment 1 shown in FIG. 1, but may be those having the same structure as that of Embodiment 2 shown in FIG. 9, or may be those having the combination of these structures.

Also, in Embodiment 3, the case where the number M of the wavelength multiplexed light sources into which a wavelength multiplexed light is input is equal to 6 is explained, the present invention can be applied to a case where $M \geq 2$.

As described above, a wavelength multiplexed light source of the present invention is configured to input a light of a longer wavelength range which has a larger modal group velocity dispersion due to the wavelength into an input position where an excited strength for each mode and a waveform broadening due to the group velocity dispersion are small. The wavelength multiplexed light source also inputs a light of a shorter wavelength range which has a smaller modal group velocity dispersion due to the wavelength into an input position where an excited strength for each mode and a waveform broadening due to the group velocity dispersion are large. Accordingly a variation of pulse widths (output pulse widths) occurs between the wavelengths of the output lights, which increases a transmission distance and a transmission speed of a wavelength multiplexed light. As a result, an efficient wavelength multiplexing transmission can be achieved.

A wavelength multiplexed light source and a wavelength multiplexed light source system according to the present invention can be applied to a wavelength multiplexed light source and a wavelength multiplexed light source system for wavelength division multiplexing communication which multiplexes wavelengths using a coupler that reduces a variation in the output pulse widths between the optical signals having different wavelengths, which is caused by the wavelength dependence of a modal group velocity dispersion, has an effect in achieving an efficient wavelength multiplexing transmission, and uses a multimode interference within a multimode waveguide.

What is claimed is:

1. A wavelength multiplexed light source, comprising:
   an input unit having an N number of input ends to which an N number of incident lights (N is an integer greater than or equal to two) of different wavelengths are input, and the N number of output ends from which the incident lights are respectively output;
   the N number of input waveguides which are respectively connected to the N number of output ends of the input unit and individually guide the N number of incident lights;
   a multimode waveguide for 1×N couplings having an input edge of a width W on one side thereof, with the N number of input waveguides being respectively connected to the input edge so that each of the incident lights is input to the input edge to be coupled at a predetermined position on an output edge on the other side opposite to the input edge; and
   an output waveguide which is connected to the predetermined position on the output edge of the multimode waveguide for 1×N couplings,
   wherein input positions where the N number of incident lights are input to the multimode waveguide for 1×N couplings are set so that, for two of the incident lights having adjacent wavelengths, the distance from the central position of the input edge of the multimode waveguide for 1×N couplings to the input position for the incident light having a longer wavelength is equal to or more than that for the incident light having a shorter wavelength.

2. The wavelength multiplexed light source according to claim 1, wherein
   each of the incident lights which are input to the input edge of the multimode waveguide for 1×N couplings has a beam diameter of W/5 or less.

3. The wavelength multiplexed light source according to claim 1, wherein
   the input unit has an incident light detecting section for detecting a wavelength and a beam diameter of each of the incident lights, and
   depending on the wavelengths and the beam diameters of the incident lights, controlling the input positions at which the incident lights are input to the multimode waveguide for 1×N couplings by switching the connection between the N number of input ends and the N number of output ends.

4. The wavelength multiplexed light source according to claim 1, wherein
   the input unit has an optical switch for switching the connection between each of the N number of input ends and each of the N number of output ends.

5. The wavelength multiplexed light source according to claim 1, further comprising:
   a beam diameter control unit which is provided at a predetermined position between the input ends of the input unit and the input edge of the multimode waveguide for 1×N couplings, for controlling a beam diameter of the incident light which is input to the input edge of the multimode waveguide for 1×N couplings to be W/5 or less in the case that the incident light has a beam diameter exceeding W/5.

6. The wavelength multiplexed light source according to claim 1, wherein
   the N number of incident lights are controlled so that the incident lights to be input to the positions closer to the central position of the input edge of the multimode waveguide for 1×N couplings are delayed to be incident to the multimode waveguide for 1×N couplings by a longer time.

7. The wavelength multiplexed light source according to claim 6, wherein
   the delays of the incident lights are controlled using modulation control of the optical signals at the N number of light sources which respectively supply the N number of incident lights.

8. The wavelength multiplexed light source according to claim 6, wherein the N number of input waveguides are those in which the guided incident lights having a shorter wavelength have a slower coherent group velocity of wavelength dispersion.

9. A wavelength multiplexed light source, comprising:

an input unit having an N number of input ends to which an N number of incident lights (N is an integer greater than or equal to two) of different wavelengths are input, and an N number of output ends from which the incident lights are respectively output;

the N number of input waveguides which are respectively connected to the N number of output ends of the input unit and individually guide the N number of incident lights;

a multimode waveguide for 1×N couplings having an input edge of a width W on one side thereof, with the N number of input waveguides being respectively connected to the input edge so that each of the incident lights is input to the input edge to be coupled at a predetermined position on an output edge on the other side opposite to the input edge; and an output waveguide which is connected to the predetermined position on the output edge of the multimode waveguide for 1×N couplings, wherein a smaller distance of two distances from the input position through which the incident light is input to the multimode waveguide for 1×N couplings to one of the positions separated from the central position of the input edge by 1/4 W on both sides of the central position, for two of the incident lights having adjacent wavelengths, the smaller distance from each of the input positions to one of the positions on both sides of the central position are equal to each other, or the smaller distance for the light having a longer wavelength is smaller than the other.

10. The wavelength multiplexed light source according to claim 9, wherein each of the incident lights which are input to the input edge of the multimode waveguide for 1×N couplings has a beam diameter exceeding W/5.

11. A wavelength multiplexed light source system, comprising:

an M number of wavelength multiplexed light sources (M is an integer greater than or equal to two) according to claim 1 or 9;

a multiplexed lights input unit, having: an M number of input ends to which the M number of wavelength multiplexed lights which are output from each of the wavelength multiplexed light sources are input, and an M number of output ends from which the wavelength multiplexed lights are respectively output;

an M number of the multiplexed light input waveguides which are connected to the M number of output ends of the multiplexed light input unit for individually guiding the M number of wavelength multiplexed lights;

a multimode waveguide for 1×M couplings having an input edge on one end thereof, with the M number of input waveguides being respectively connected to the input edge in the width direction so that each of the wavelength multiplexed lights is input to the input edge to be coupled at a predetermined position on an output edge on the other side opposite to the input edge; and a multiplexed light output waveguide which is connected to the predetermined position on the output edge of the multimode waveguide for 1×M couplings.

12. The wavelength multiplexed light source system according to claim 11, wherein the M number of wavelength multiplexed lights have M number of wavelength ranges which are different from each other and do not overlap each other.

* * * * *